United States Patent [19]
Daum

[11] Patent Number: 5,596,420
[45] Date of Patent: Jan. 21, 1997

[54] AUTO LATENCY CORRECTION METHOD AND APPARATUS FOR MPEG PLAYBACK SYSTEM

[75] Inventor: Daniel Daum, San Jose, Calif.

[73] Assignee: Cirrus Logic, Inc., Fremont, Calif.

[21] Appl. No.: 483,580

[22] Filed: Jun. 7, 1995

Related U.S. Application Data

[63] Continuation-in-part of Ser. No. 358,610, Dec. 12, 1994.

[51] Int. Cl.$^6$ ............................ H04N 5/76; H04N 5/91; H04N 9/475
[52] U.S. Cl. ............................ 386/110; 348/515; 386/65; 386/75; 386/101
[58] Field of Search ............................ 358/335, 310, 358/341, 342, 343; 360/19.1, 33.1; 348/515; H04N 5/76, 5/91, 5/92, 5/78, 9/475

[56] References Cited

U.S. PATENT DOCUMENTS

| | | | |
|---|---|---|---|
| 5,055,939 | 10/1991 | Karamon et al. | 358/341 |
| 5,121,202 | 6/1992 | Tanoi | 358/136 |
| 5,185,819 | 2/1993 | Ng et al. | 382/56 |
| 5,212,549 | 5/1993 | Ng et al. | 358/135 |
| 5,276,513 | 1/1994 | van der Wal et al. | 358/136 |
| 5,325,125 | 6/1994 | Naimpally et al. | 348/402 |
| 5,387,940 | 2/1995 | Kwok et al. | 348/446 |
| 5,502,513 | 3/1996 | Fujinami | 358/339 |

*Primary Examiner*—Thai Q. Tran
*Attorney, Agent, or Firm*—Robert Platt Bell & Associates, P.C.

[57] ABSTRACT

A multimedia system including an audio/video decoder/decompresser for decoding/decompressing a compressed encoded audio/video data stream to generate video images for display and audio signals for audible reproduction. The multimedia system includes an integrated system and video decoder with an audio/video synchronization circuit for substantially synchronizing the display of video images with audio playback. Latency between Audio and Video decompression/decoding may be adjusted dynamically by internal hardware. Hardware signals indicating the need to skip or repeat a frame or frames of video or audio data are fed to a hardware circuit which may increment or decrement a latency value accordingly. The latency value is thus stepwise incremented or decremented until no further frame skips/repeats occur. The hardware implementation allows for better matching of latency value to audio and video decoder, frees up software for other tasks and reduces software code requirements. In addition, changes to the audio and video data paths (e.g., switching to an auxiliary audio decoder) are automatically and quickly compensated for. The hardware implementation may provide for additional levels of latency adjustment.

20 Claims, 19 Drawing Sheets

| BIT#:> SCLK: | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 768 | 0 | 0 | 0 | 0 | 0 | 0 | 0 | 0 | 1 | 1 | 0 | 0 | 0 | 0 | 0 | 0 | 0 | 0 |
| 1536 | 0 | 0 | 0 | 0 | 0 | 0 | 0 | 1 | 1 | 0 | 0 | 0 | 0 | 0 | 0 | 0 | 0 | 0 |
| 2304 | 0 | 0 | 0 | 0 | 0 | 0 | 1 | 0 | 0 | 1 | 0 | 0 | 0 | 0 | 0 | 0 | 0 | 0 |
| 3072 | 0 | 0 | 0 | 0 | 0 | 0 | 1 | 1 | 0 | 0 | 0 | 0 | 0 | 0 | 0 | 0 | 0 | 0 |
| 4608 | 0 | 0 | 0 | 0 | 0 | 1 | 0 | 0 | 1 | 0 | 0 | 0 | 0 | 0 | 0 | 0 | 0 | 0 |
| 5376 | 0 | 0 | 0 | 0 | 0 | 1 | 0 | 1 | 0 | 1 | 0 | 0 | 0 | 0 | 0 | 0 | 0 | 0 |
| 6144 | 0 | 0 | 0 | 0 | 0 | 1 | 1 | 0 | 0 | 0 | 0 | 0 | 0 | 0 | 0 | 0 | 0 | 0 |
| 7680 | 0 | 0 | 0 | 0 | 0 | 1 | 1 | 1 | 1 | 0 | 0 | 0 | 0 | 0 | 0 | 0 | 0 | 0 |
| 9216 | 0 | 0 | 0 | 0 | 1 | 0 | 0 | 1 | 0 | 0 | 0 | 0 | 0 | 0 | 0 | 0 | 0 | 0 |
| 10752 | 0 | 0 | 0 | 0 | 1 | 0 | 1 | 0 | 1 | 0 | 0 | 0 | 0 | 0 | 0 | 0 | 0 | 0 |
| 15360 | 0 | 0 | 0 | 0 | 1 | 1 | 1 | 1 | 0 | 0 | 0 | 0 | 0 | 0 | 0 | 0 | 0 | 0 |
| 18452 | 0 | 0 | 0 | 1 | 0 | 0 | 1 | 0 | 0 | 0 | 0 | 0 | 0 | 0 | 0 | 0 | 0 | 0 |
| TIME:> | 1·446 | 740 | 370 | 182 | 91·2 | 45·6 | 22·8 | 11·3 | 5·69 | 2·84 | 1·42 | 712 | 356 | 178 | 88·8 | 44·4 | 22·2 | 11·1 |
| | SEC | MS | MS | MS | MS | MS | MS | MS | MS | MS | MS | MS | US | US | US | US | US | US |

FIGURE 9

AUTO LATENCY CORRECTION METHOD AND APPARATUS FOR MPEG PLAYBACK SYSTEM

CROSS-REFERENCE TO RELATED APPLICATIONS

This application is a continuation-in-part application of copending application Ser. No. 08/358,610, filed Dec. 12, 1994.

FIELD OF THE INVENTION

This invention relates generally to the field of multimedia systems. More particularly, this invention relates to a synchronization method and circuitry for a multimedia PC wherein circuitry provides synchronization between audio playback and the video display. The invention may be particularly suited for the Motion Picture Expert Group's (MPEG I+II) data compression and decompression standards.

BACKGROUND OF THE INVENTION

Personal computers have been adapted to run multimedia software applications which include audio and video information. Several multimedia specification committees have established and proposed standards for encoding/compressing and decoding/decompressing audio and video information. MPEG I and II, established by the Motion Picture Expert Group, are the most widely accepted international standards in the field of the multimedia PC software applications. Other standards are JPEG and Motion JPEG established by the Joint Photographic Expert Group.

FIG. 1A illustrates an MPEG audio and video decoding system 120 which decompresses video and/or audio data compressed and coded according to the MPEG algorithm. System decoder 110 reads encoded MPEG data stream 101, which may include interspersed compressed video and/or audio data, and generates timing information as Video Presentation Time Stamp (VPTS) 104, System Clock Reference (SCR) 105, and Audio Presentation Time Stamp (APTS) 106. Video decoder 111 decodes and decompresses video data stream 102 and generates a decoded/decompressed video signal 107. Audio decoder 112 decodes and decompresses audio data stream 103 and generates decoded/decompressed audio signal 108. Decoded/decompressed video signal 107 may be coupled to a PC monitor or other type of display while decoded/decompressed audio signal 108 may be coupled to an audio speaker or other audio generation means (not shown).

FIG. 1B, from page 49 of the ISO/IEC 11172-1:1993(E) International Standard specification for MPEG, incorporated herein by reference, illustrates a detailed diagram of how the data stream of encoded/compressed data may be encapsulated and communicated using packets. Data stream 160 may have different layers such as an ISO layer and a Pack layer. In the ISO layer, a series of packages 161 are communicated until an ISO end code 164 is reached. Each package 161 may be defined as having a Pack Start Code 162 and Pack Data 163. At the pack layer, each package 161 may be defined as having a pack start code 162, a system clock reference 117, a system header 180, and packets of data 165–168. Ellipses 167 illustrate a number of packets. System clock reference 117 may be further defined to be bit pattern 0010, three bits of X 185, bit pattern of 1, fifteen bits of Y 186, bit pattern 1, fifteen bits of Z 187, bit pattern 11, multiplexer rate 188, and bit pattern 1. Three bits of X 185, fifteen bits of Y 186, and fifteen bits of Z 187 make up a 33 bit pattern representing the system clock reference (SCR). The system clock reference represents the referenced system time.

Multiplexer rate 188 represents how often audio packets are interspersed between video packets. Each packet 165–168 may be illustrated similar to packet 166. Packet 166 has a three byte packet start code prefix 170A, a one byte stream ID 170B, a two byte packet length 171, h-bytes of other header data 172, and N-bytes of packet data 173. N-bytes of packet data 173 may represent audio or video data. When using a compression/encoding method such as MPEG I, MPEG II, or JPEG, the data packets are encoded appropriately. The h-bytes of other header data 172 may comprise one to sixteen stuffing bytes 140, code bits 141, one flag bit 142 for a standard buffer scale, thirteen standard buffer size bits 143, and one, five, or ten bytes of Time Stamp information 150 respectively representing nothing, a presentation time stamp (PTS), or a presentation time stamp (PTS) with a decoding time stamp (DTS).

The presentation time stamp may be an audio presentation time stamp (APTS) if the following data packet 173 contains audio information. Alternatively it may be a video presentation time stamp (VPTS) if the following data packet 173 contains video information. In either of these cases the APTS or the VPTS may be represented by five bytes or 33 bits of information with 7 bits unused.

FIG. 3A illustrates a simplified example 315 of the encoded/compressed data stream 101 as compared to FIG. 1B. An encoded/compressed data stream may contain a plurality of encoded/compressed video data packets or blocks and a plurality of encoded/compressed audio data packets or blocks. MPEG encodes/compresses video packets based on video frames or pictures.

Three types of video frames may be used. An intra or I-type frame may comprise a frame of video data coded using information about itself. Only one given noncompressed video frame may be encoded/compressed into one I-type frame of encoded/compressed video data. A predictive or P-type frame may comprise a frame of video data encoded/compressed using motion compensated prediction from a past reference frame. A previous encoded/compressed frame, such as I-type or P-type may be used to encode/compress a current noncompressed frame of video data into a P-type frame of encoded compressed video data. A bi-directional or B-type of frame may comprise a frame of video data encoded/compressed using a motion compensated prediction from a past and future reference frame, or a past, or a future reference frame of video data. A reference frame may be either an I-type frame or a P-type frame.

B-type frames are usually inserted between I-type or P-type frames, combinations, or either, where fast motion occurs within an image across frames. Motion compensation refers to using motion vectors from one frame to the next to improve the efficiency of predicting pixel values for encoding/compression and decoding/decompression. The method of prediction uses the motion vectors to provide offset values and error data which refer to a past or a future frame of video data having decoded pixel values which may be used with the error data to compress/encode or decompress/decode a given frame of video data.

More data may be required to display an image than to generate accompanying audio, as an image may have varying resolutions and include motion and frame rates may be greater. Thus, video data packets such as 303–305 may occur more frequently within the MPEG data stream than audio data packets such as 311. The infrequent interspersion of audio data packets between video data packets may cause an image frame to be displayed before or after the audio has been reproduced. Time stamps are provided within the encoded/compressed data stream to facilitate the synchronization of audio and video.

Video presentation time stamps (VPTS) 300–302 are provided at various intervals 306–308 of a given system time clock 316. The audio presentation time stamps (APTS) exemplified by 310 are also provided at various intervals 312 of the MPEG data stream. Additionally, there may be a system clock reference (SCR) 317 provided at various intervals 318. Each of these SCR, VPTS, and APTS are 33 bit values representing a time value. The MPEG standard recommends that the MPEG decoder use the 33-bit VPTS as the starting time of the video display sequence and the 33-bit APTS for the starting time of the audio playback sequence. The APTS and VPTS may jointly be referred to as presentation time stamps (PTS). The MPEG standard may require that a APTS, VPTS, and SCR show up in the bitstream at least once every seven tenths (0.7) of a second.

In the prior art, the 33-bit system clock reference (SCR) has been used as the reference time for both video and audio display to minimize the deviation between video and audio playback. The SCR was loaded into a counter, referred to as the system counter, and incremented by a 90 kilohertz system clock (SCLK). The output of the system counter was compared with the VPTS within video decoder 111 and the APTS within audio decoder 112 to determine by how much the audio or video playback was out-of-sync. If a threshold level was reached, the video would jump to be correctly in sync with the audio. Thus, the SCR may be used to resynchronize the video playback with the audio playback.

In some decoding systems, a video clock or decoding clock may be generated without reference to the SCR and it may not be locked or corrected such that a time drift (lead or lag) may appear in the synthesized VPTS derived from the video or decoding clock. This time drift may cause in one second, or 90000 system clock cycles, time errors on the order of 50 parts per million. This may be equivalent to the synthesized VPTS values differing from actual VPTS values by 44 to 67 μsecs. In systems which do not correct for out-of-sync conditions, the time error may accumulate and cause the video image to lead or lag the audio playback by 1 frame every 5 to 6 minutes. The frame lead or lag may also accumulate over larger periods of time if the video display and the audio playback are not occasionally resynchronized.

SUMMARY AND OBJECTS OF THE INVENTION

The present invention includes an apparatus for controlling playback of audio and video signals from an encoded data stream comprising at least audio data packets, video data packets, audio presentation time stamps and video presentation time stamps. A system decoder receives the encoded data stream and separates the data stream into an encoded audio data stream comprising at least audio data packets and audio presentation time stamps and an encoded video data stream comprising at least the video data packets and video presentation time stamps. An audio decoder receives the audio data packets from the encoded audio data stream and decodes the audio data packets.

A video decoder coupled to the system decoder and the audio decoder, receives the system time clock and the encoded video data stream and decodes the encoded video data stream in synchronization with the system time clock. The video decoder includes a latency value register for storing a video decoder latency value and a counter for adding the latency value to a video presentation time stamp value to produce a normalized video presentation time stamp value. A subtracter coupled to the counter subtracts the normalized video presentation time stamp value from an audio presentation time stamp value to produce a difference value.

A comparator coupled to the subtracter compares the difference value with a predetermined time drift threshold and outputs a video frame skip signal if the difference value exceeds the pre-determined time drift threshold and the difference value is negative and outputs a video frame repeat signal if the difference value exceeds the predetermined time drift threshold and the difference value is positive. The latency value is adjusted by adding a predetermined value to the latency value stored in the latency value register if a video frame repeat signal is generated by the comparator. The latency value is adjusted by subtracting a predetermined value from the latency value stored in the latency value register if a video frame skip signal is generated by the comparator.

The comparator may compare the difference value with a predetermined time drift threshold and output a single video frame skip signal if the difference value exceeds the predetermined time drift threshold by a first predetermined amount and the difference value is negative. The comparator may further output a multiple video frame skip signal if the difference value exceeds the pre-determined time drift threshold by a second predetermined amount and the difference value is negative.

The latency value may then be adjusted by subtracting a first predetermined value from the latency value stored in the latency value register if a single video frame skip signal is generated by the comparator. The latency value may also be adjusted by subtracting a second predetermined value from the latency value stored in the latency value register if a multiple video frame skip signal is generated by the comparator.

The comparator may compare the difference value with a predetermined time drift threshold and output a single video frame repeat signal if the difference value exceeds the predetermined time drift threshold by a first predetermined amount and the difference value is positive. The comparator may further output a multiple video frame repeat signal if the difference value exceeds the pre-determined time drift threshold by a second predetermined amount and the difference value is positive.

The latency value may be adjusted by adding a first predetermined value to the latency value stored in the latency value register if a single video frame repeat signal is generated by the comparator. The latency value may be adjusted by adding a second predetermined value to the latency value stored in the latency value register if a multiple video frame repeat signal is generated by the comparator.

It is an object of the present invention to provide an automatic latency control for an audio/video playback system.

It is a further object of the present invention to provide an auto latency control for an audio/video playback system which dynamically adjusts a latency value in response to skipped or repeated frames.

It is a further object of the present invention to provide an auto latency control implemented in video decoder hardware so as to simplify the software model for operating such hardware in conjunction with an audio decoder.

BRIEF DESCRIPTIONS OF THE DRAWINGS

FIG. 9 illustrates a binary table of selected offset values and the respective time for each bit to determine truncation.

DETAILED DESCRIPTION OF THE INVENTION

Figure 1A:
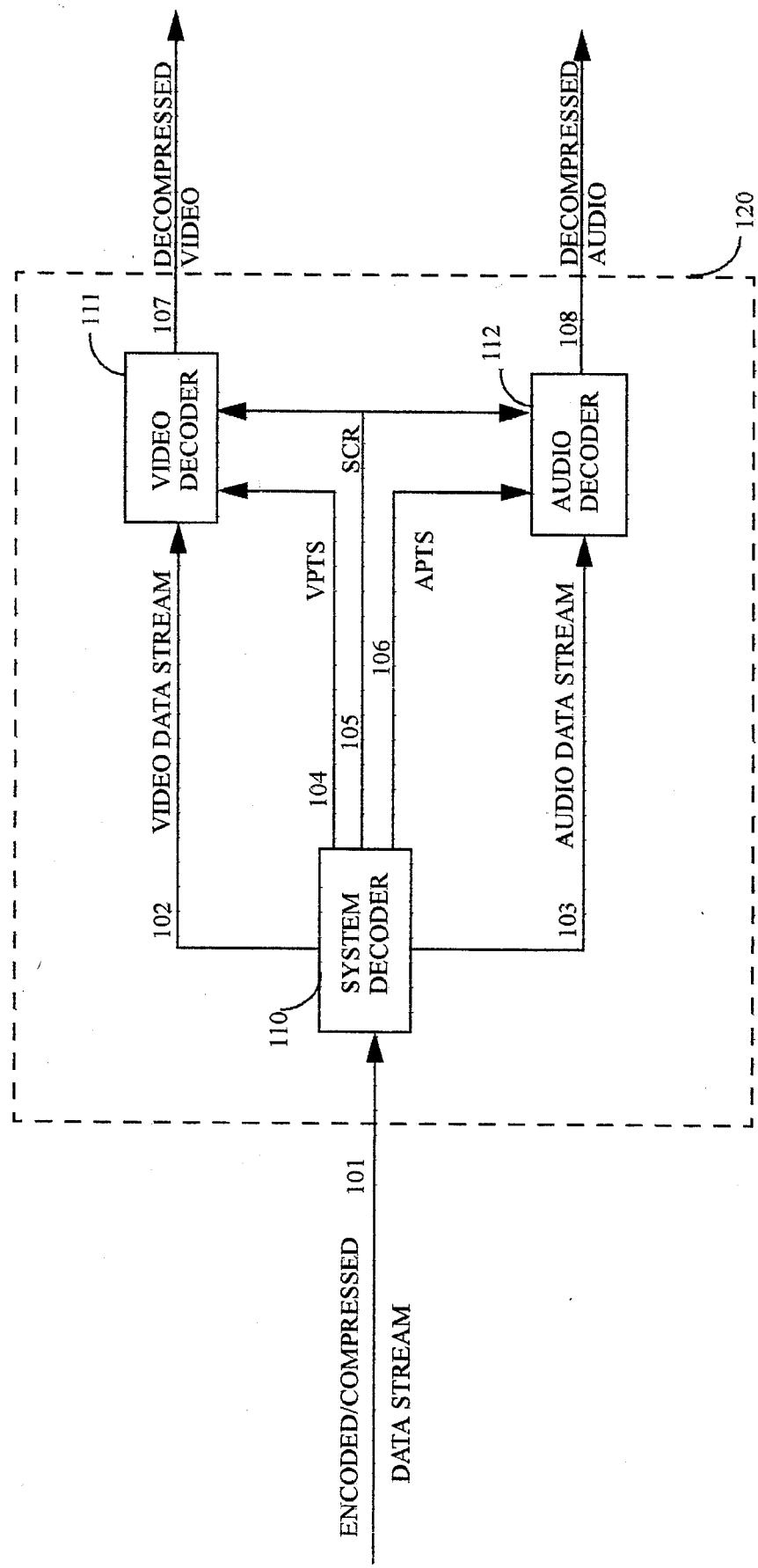
FIG. 1A illustrates a prior art block diagram of an MPEG decoding system.
Figure 1B:
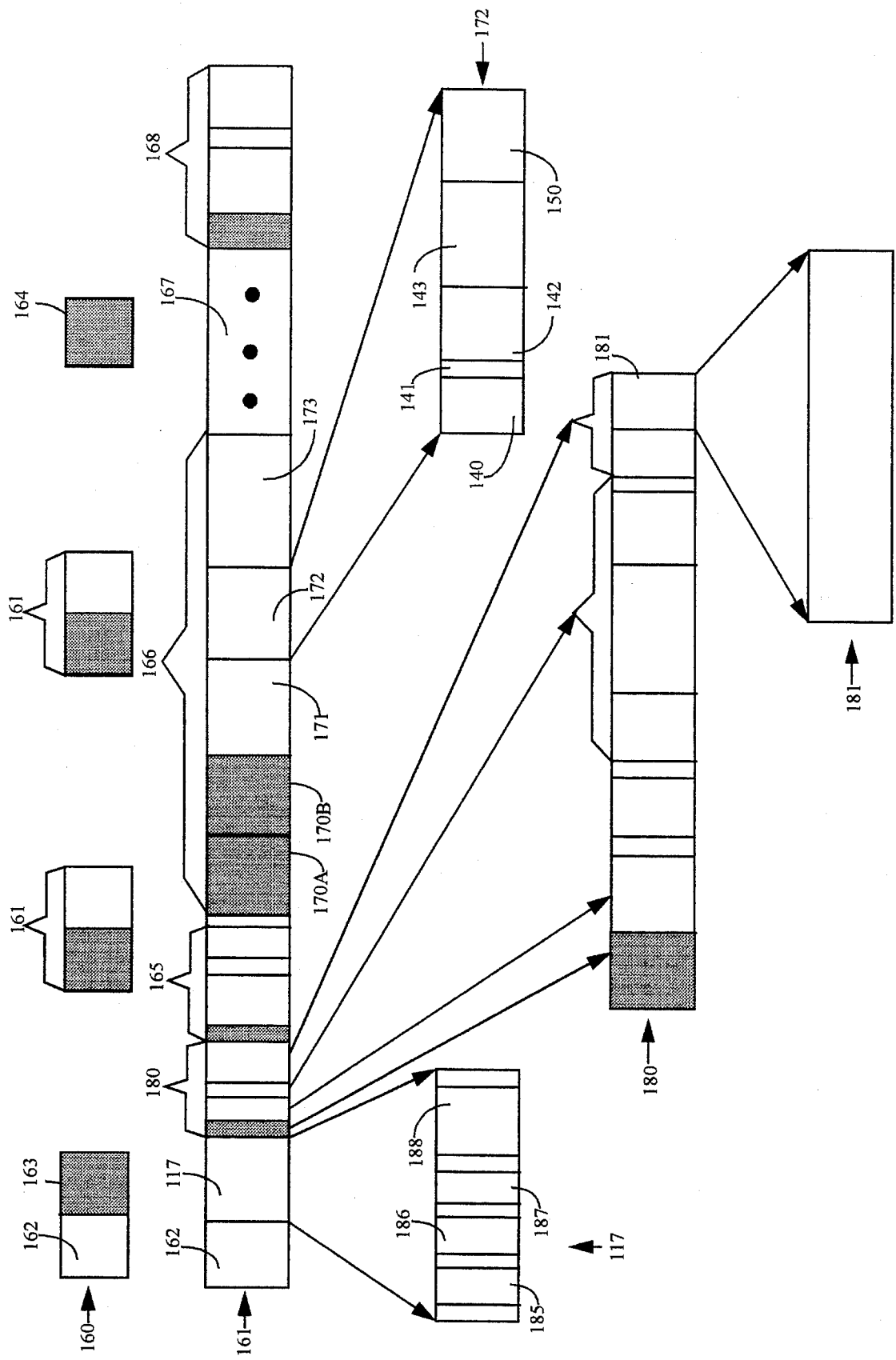
FIG. 1B illustrates a prior art encoded data stream format for serial transmission of audio and video data.
Figure 2A:
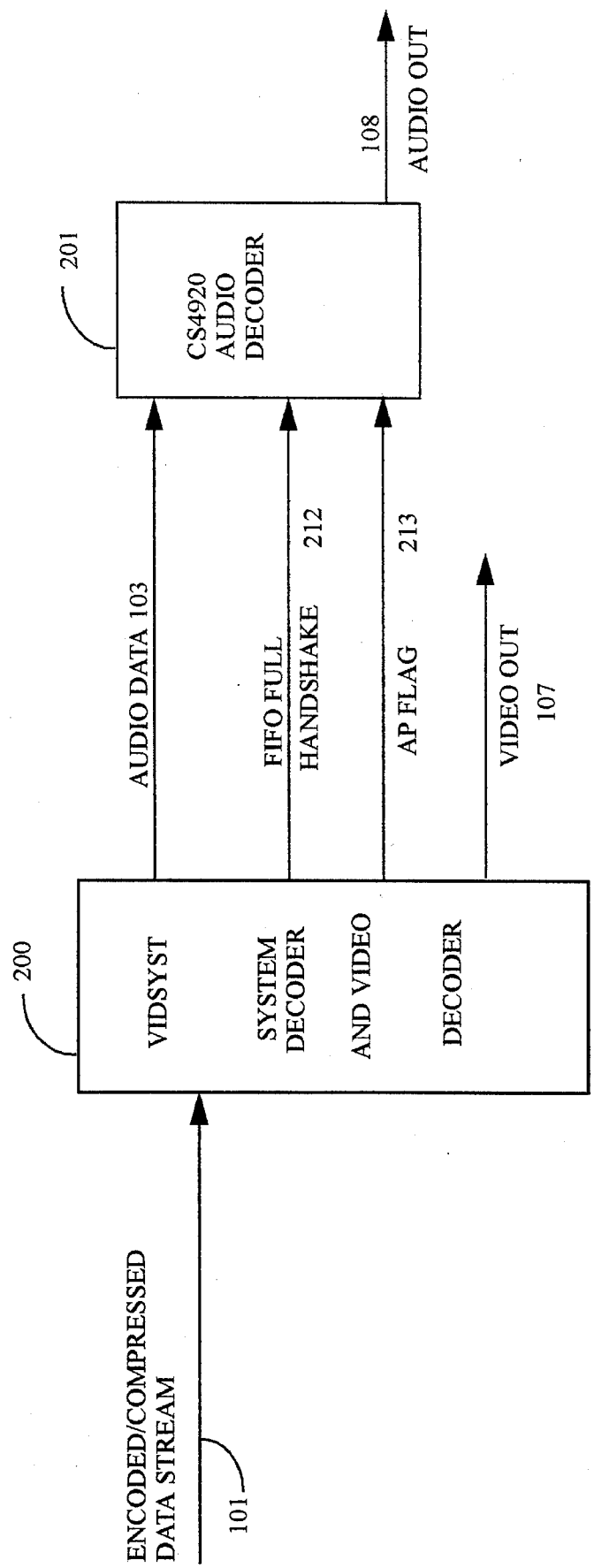
FIG. 2A is a block diagram of an MPEG decoding system including the circuit and algorithm of the present invention.

In prior art FIG. 1A, video presentation time stamp (VPTS) 104 may be compared against the SCR 105 to determine time drift. Referring to FIG. 2A, the audio decoder of the present invention detects the presence of an APTS in audio data stream 103 and sets a corresponding AP flag 213 when a corresponding portion of the audio data stream has been played back. Video data may then be synchronized in vidsyst decoder 200 with the audio playback. Vidsyst decoder 200 may comprise, a monolithic integrated circuit, and may include at least a portion of the algorithm and circuitry of the present invention.

FIG. 2A illustrates a simplified block diagram of an MPEG audio/video decoder system which includes vidsyst decoder 200. FIG. 4C is a block diagram of vidsyst decoder 200. Vidsyst decoder 200 may include a system decoder 250 which receives MPEG data stream 101 and parses video data packets from audio data packets as well as timing information (VPTS, SCR, APTS) from the data packets. Video data packets are sent as a video data stream 102 to video decoder 251. Video data packets within video data stream 102 are decoded and decompressed within video decoder 251 to generate decoded/decompressed video data 107.

Within video decoder 251 of vidsyst decoder 200, there may be provided an A/V sync circuit (not shown) to correct for time drift. The A/V sync circuit controls the generation of decoded/decompressed video to resynchronize the video image displayed with the audio playback if time drift exceeds predetermined limits.

Audio data packets parsed by the system decoder 250 within the vidsyst decoder 200 are sent externally as an audio data stream 103 to the audio decoder 201. Audio decoder 201 may also comprise a monolithic integrated circuit such as a DSP chip or a dedicated audio decoder such as the CS4920 manufactured by Crystal Semiconductor of Austin, Tex. Audio decoder 201 need not provide synchronization because as synchronization may be performed entirely by vidsyst decoder 200. In addition, it may be undesirable to provide synchronization by adjusting audio playback, as repeated or skipped frames of audio data are readily discernable to a listener, whereas repeated or skipped frames of video may not be as noticeable to a viewer.

Figure 3A:
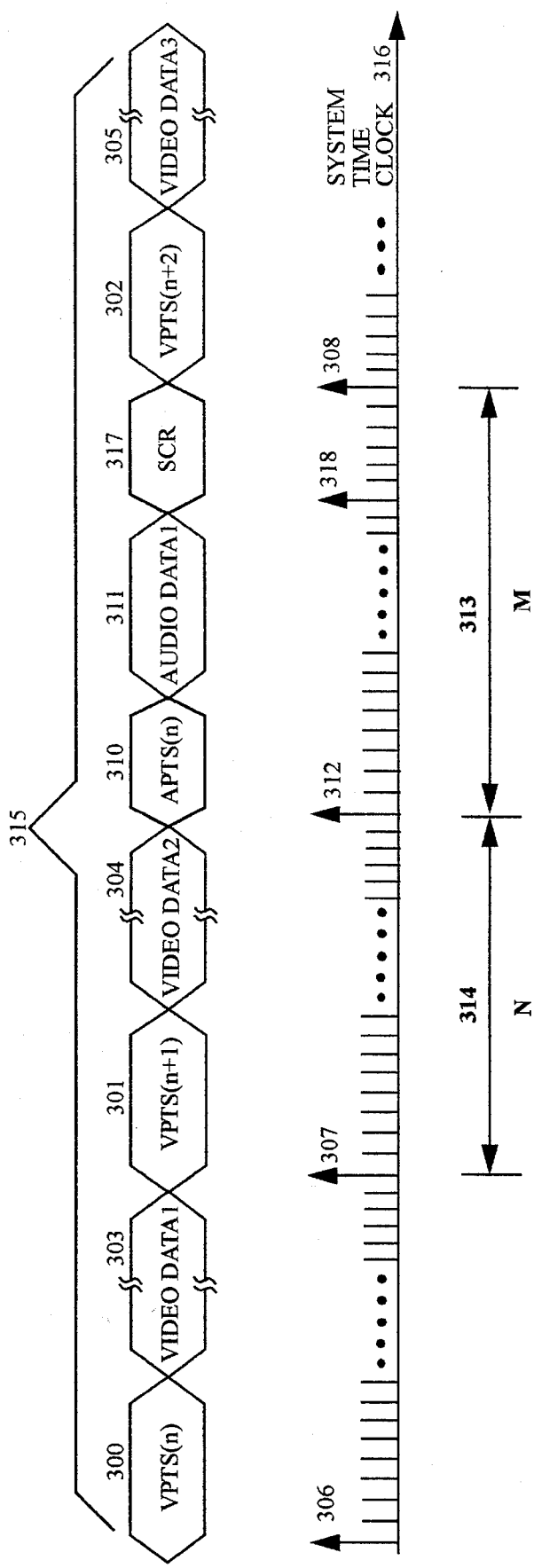
FIG. 3A illustrates a simplified waveform diagram and system timing for the MPEG data stream as illustrated in FIG. 1B.
Figure 3B:
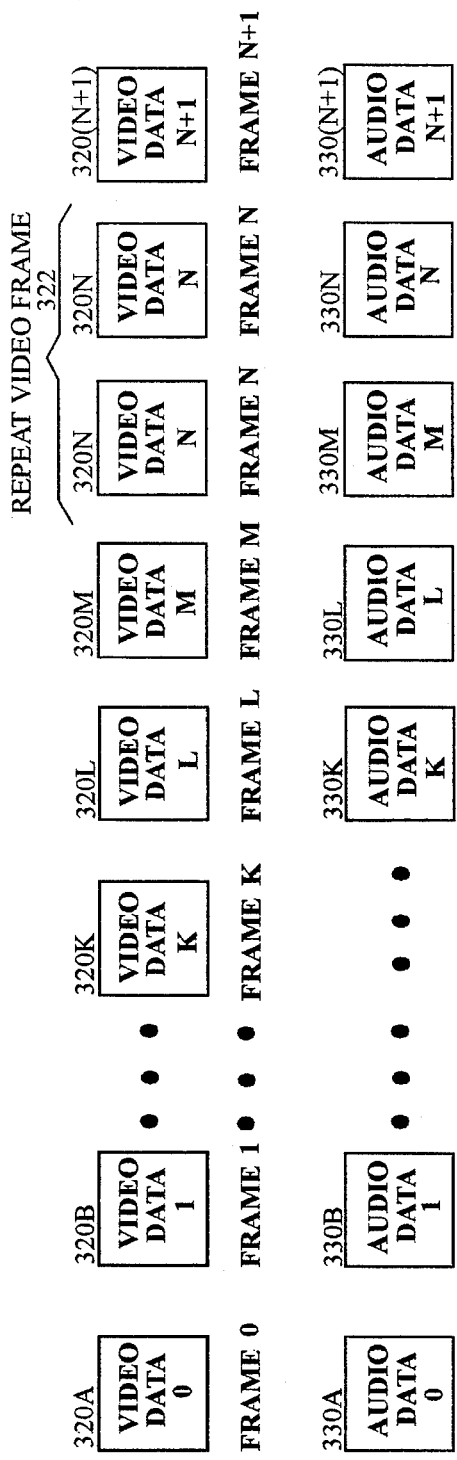
FIG. 3B illustrates how a leading video frame may be resynchronized with the audio data.
Figure 3C:
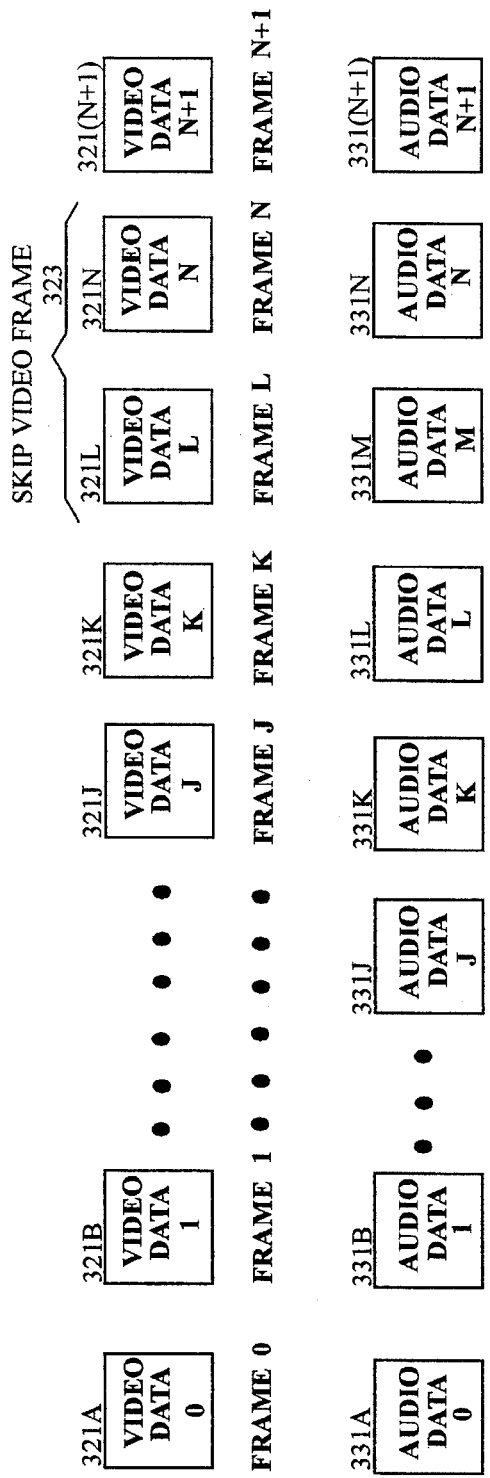
FIG. 3C illustrates how a lagging video frame may be resynchronized with the audio data.

FIGS. 3B and 3C illustrate how the video display may be resynchronized to the audio playback by the present invention. Referring to FIG. 3B, the video display over time may be illustrated by the sequence of video data frame(0) 320A to video data frame(N+1) 320(N+1). Audio playback over time may be illustrated by the sequence of audio data(0) 330A to audio data(N+1) 330(N+1). FIG. 3C is similarly illustrated. In FIG. 3B the video data frame leads the audio data such that in order to resynchronize the video data frame with the audio data, a video data frame may be repeated in order to allow the audio to catch up. Assume initially that video data frame(0) 320A and audio data(0) 330A are in complete synchronization. Over time video data frame(K) 320K leads audio data(K) 330K. Once a lead threshold—such as one or one half frame—is reached, the A/V sync circuit causes the video frame (or half frame as the case may be) to be repeated. In FIG. 3B a one frame lead threshold may be reached wherein video data frame(M) 320M leads audio data(M) 330M by one frame such that next video data frame(N) 320N may be repeated on the video display as illustrated by repeat video frame 322. Thus video data frame(N) 320N may be resynchronized with audio data(N) 330N.

Referring to FIG. 3C, the video data frame lags the audio data such that in order to resynchronize the video data frame with the audio data, a video data frame may be skipped. Initially, video data frame(0) 321A and audio data(0) 331A are in complete synchronization. Over time video data frame(J) 321J lags audio data(J) 331J. Once a lag threshold—such as one or one half frame—is reached, the A/V sync circuit causes a video frame (or half frame as the case may be) to be skipped.

In FIG. 3C a one frame lag threshold may be reached wherein video data frame(L) 320L leads audio data(N) 331N by one frame such that the next video data frame(M) (not shown) may be skipped on the video display as illustrated by skipped video frame 323. In place of video data frame(M) video data frame(N) 321N may be displayed when audio data(N) 331N may be played. Thus, video data frame(N) 321N may be resynchronized with audio data(N) 331N.

FIGS. 3B and 3C illustrate repeating or skipping one whole frame. Repeating one half frame may require holding the upper half of a frame the same while updating the lower half of the frame with the according portion of a new frame of data. Skipping one half frame may require updating the lower half of the frame with the according half of the current frame of data while updating the upper half of the frame with the according portion of the next frame of data.

FIGS. 3B and 3C are only exemplary of skipping and repeating a single video data frame as multiple frames may be skipped or repeated. If the audio and video are out of sync by more than one frame it may be desirable to skip or repeat multiple frames. In certain applications, a user may select to freeze or repeat a video data frame while allowing the audio data to be continually reproduced and audible. In another case, the user may desire to fast forward by skipping multiple frames or pause and step through a number of video data frames. In either case, it may be desirable to mute the audio data and then resynchronize the video with the audio track once the desired video data frame has been found in which to start normal playback.

A requirement of MPEG decoding may limit the type of encoded/compressed frames of video which may be skipped. The capability to decode/decompress P-type frames from the previous I-type frame normally may require that only B-type frames are skipped, with the exception of the last P-type frame immediately preceding an I-type frame.

For example consider the encoded/compressed data stream to have the following frame sequence $I_1B_2B_3P_4B_5P_6B_7P_8B_9B_{10}P_{11} \ldots P_{n-3}B_{n-2}P_{n-1}I_n$ where B represents a B-type encoded frame, P represents a P-type encoded frame and I represents an I-type encoded frame of video. To decode a predicted or P-type frame, prior decoding of an I-type frame may be required. Thus, $P_4$ may require $I_1$ to be decoded first such that the encoded/compressed $I_1$ frame may not be skipped by the hardware. Similarly, the frame $P_6$ may require that $P_4$ be available in order to decode/decompress frame $P_6$. Thus $P_4$ may not be skipped either. While frame $B_3$ may require both $P_4$ and $I_1$, the B-type frames are inserted frames between I-type, P-type, or a combination during encoding and are not necessary to a faithful reproduction of an image. The last P-type frames before an I-type frame, such as $P_{n-1}$ in the example, may be skipped as well. No future frame relies on having $P_{n-1}$ available in order to be decoded/decompressed.

Hardware which skips decoded/decompressed frames may not have this limitation but may require larger amounts of memory. Software methods which skip encoded/compressed frames may not have such limitation because software may predecode to determine frame types. However software methods do not operate in a real-time fashion as do hardware methods.

In synchronizing the video and audio, it may be desirable to provide a frame synchronization resolution of plus or minus one half frame or a multitude thereof. In this manner, decoding encoded/compressed data having one half frame of time drift provides a well synchronized reproduction of video images and audio playback. For the purposes of illustration, the operation of the present invention will be described using the MPEG I compression/encoding standard. It can be appreciated that the present invention may be modified to support other compression/encoding standards such as MPEG II and motion JPEG.

In order to compress/decode the MPEG encoded/compressed bit stream, the MPEG standard recommends a ninety kilohertz clock frequency be used as the system reference clock (SCLK) for any decoding circuitry. A system reference clock frequency of ninety kilohertz may be equivalent to a clock period of 11.11 microseconds. The video display rate or frame rate, which may be the number of image frames displayed on a monitor or like device over a period of time, may vary. A frame rate of 60 frames per second (fps) may be sometimes referred to as real time because the human eye through its averaging properties sees the display having smooth and normal motion as opposed to flickered motion. A frame rate of 30 fps may require less data than that of 60 fps to be displayed on a screen but does not have as smooth and normal motion and appears somewhat flickered. A frame rate of 30 fps may be considered ideal for CDROMs and multimedia applications—balancing the data requirements against the image quality. A frame rate of 30 fps may be equivalent to displaying one image frame for approximately 33.33 milliseconds on a display device. For a synchronization resolution of one half frame, an allowable time drift may be approximately one half of 33.33 milliseconds or 16.67 milliseconds. In the time period of 16.67 milliseconds, the system clock (SCLK) would have gone through approximately 1500 cycles. Thus a resolution of one half frame synchronization may require a time drift of less than 1500 SCLK clock cycles. Through similar reasoning, if a resolution of one half frame synchronization for a frame rate of 60 fps may be desired, the time drift should be approximately 750 SCLK clock cycles. If the resolution for 30 fps may be 2.5 frames, the allowable time drift should be 5 times the time drift of one half frame of 1500 SCLK clock cycles or 7500 SCLK clock cycles. Similarly, if the resolution for 30 fps may be one frame, the allowable drift may be twice that of the one half frame of 1500 SCLK clock cycle which equals 3000 SCLK clock cycles. Accordingly, 3 frames of time drift for 30 fps may be equivalent to 9000 SCLK clock cycles. Summarizing, the time drift for 30 fps of one half frame, one frame, 2.5 frames, and 3 frames may respectively be 1500, 3000, 7500, and 9000 SCLK clock cycles. For 60 fps, a time drift of one half frame, one frame, 2.5 frames, and 3 frames may respectively be 750, 1500, 3750, and 4500 SCLK clock cycles. In the present invention, the system clock (SCLK) may be used to determine time drift.

The present invention may use the difference between the VPTS and the APTS in order to determine an out-of-sync condition. Referring to FIG. 3A, the system clock time line 316 illustrates the incremental clock cycles of the system clock SCLK. MPEG bit stream 315 illustrates an example of an MPEG bit stream. The occurrence of the VPTS (306–308), APTS 312, and SCR 318 timing information within the MPEG bit stream 315 coincides with a given clock cycle number of SCLK. As illustrated in FIG. 3A, there may be a latency in the occurrence of VPTS 308 from the occurrence of APTS 312. The number of SCLK clock cycles for the latency between receiving VPTS 307 and APTS 312 may be the value N 314. The number of SCLK clock cycles for the latency between receiving APTS 312 and VPTS 308 may be the value M 313.

Figure 4A:
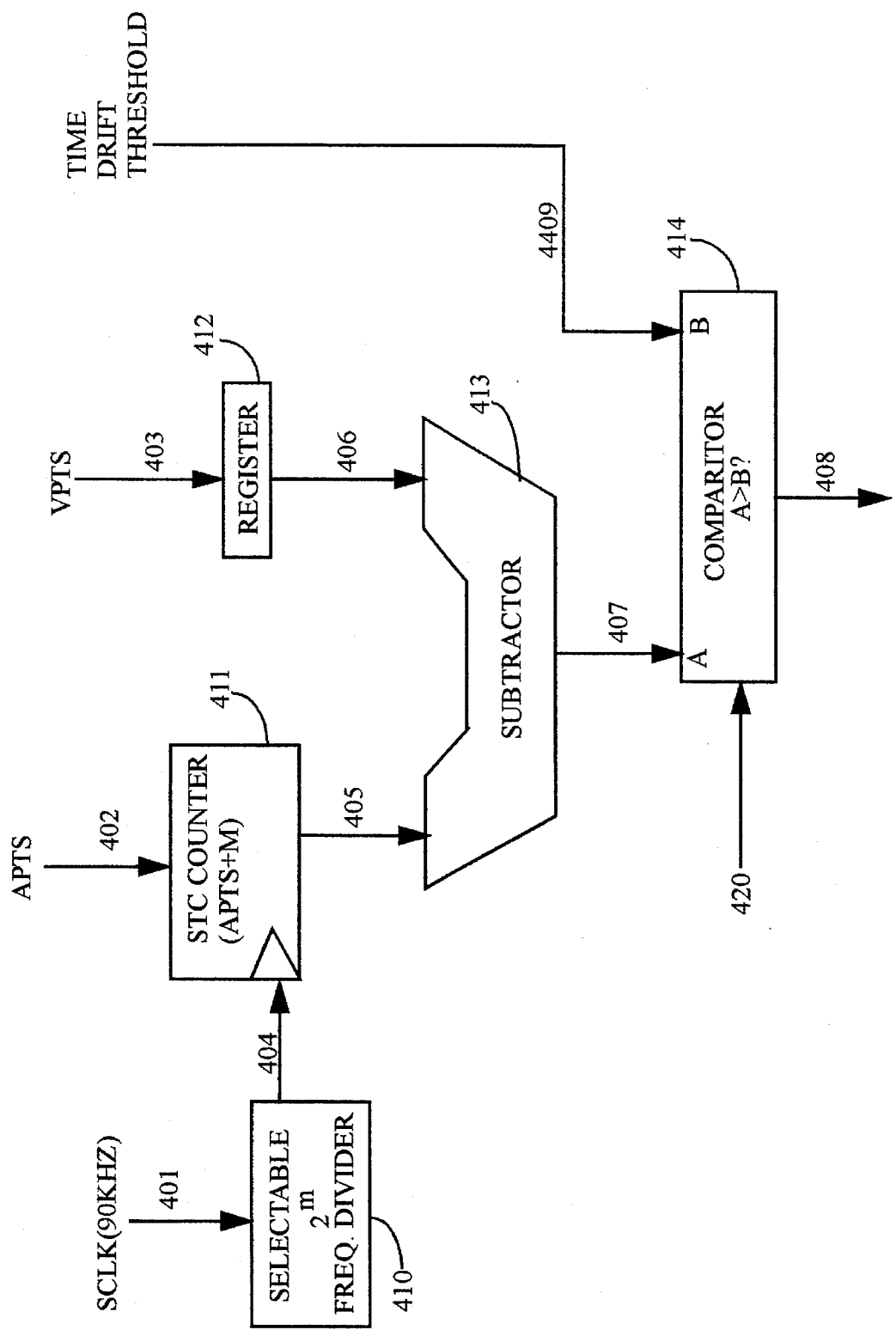
FIG. 4A illustrates a simplified block diagram for logic of the preferred embodiment of the present invention.

For example, consider FIGS. 3A and 4A where a counter 411 counts the value M 313 and a register 412 may be eventually stored with the value of VPTS 308. Upon the occurrence of the APTS 312, the counter 411 adds a number of SCLK clock cycles corresponding to a stored latency value M 313. The value of N may be similarly counted as illustrated in the block diagram in FIG. 4A.

APTS and VPTS are 33 bit time stamp values. Thus, for example, APTS 312 may have a time stamp value of 2 PM, 6 min, 5.110 sec and VPTS 308 may have a time stamp value of 2 PM, 6 min, 5.290 sec. Comparing these two time stamps the VPTS 308 has a later time value than the APTS 312. In order to properly compare whether the video leads or lags the audio the APTS may be normalized or corrected to the later occurring VPTS. Thus the latency value M needs to be added to the APTS in order have the same frame of reference. Note that a time drift threshold of one half frame time at 30 fps may be approximately 16.67 ms or 0.01667 seconds.

In case one, assume that M has a time value of 0.166 sec. Adding M to the APTS value provides (APTS+M)=2 PM, 6 min, 5.176 sec, which may be the normalized APTS value. Comparing the sum of the normalized APTS value to the VPTS value of 2 PM, 6 min, 5.290 sec, the video leads the audio by 0.114 sec. (i.e. VPTS−(APTS+M)=0.114 sec.) Thus, the VPTS may be greater than the normalized APTS, (APTS+M), by 0.114 seconds. If played on a multimedia system, the user may visualize an older frame of video and hear the audio which matches an earlier frame of video such that the video display of images leads the audio playback, such as illustrated by frame 320N and frame 330M of FIG. 3B.

Alternatively, it may be said that the audio lags the video; however, it may be preferable to use the audio data as the frame of reference. Thus it would be desirable to slow down the video or hold and repeat a video frame to allow the audio data to age and match the given video frame.

In case two, assume that M has a time value of 0.333 sec such that (APTS+M)=2 pm, 6 min, 5.443 sec. Comparing the normalized APTS to the VPTS value of 2 pm, 6 min, 5.290 sec by performing (APTS+M)−VPTS, the result equals 0.153 sec. Note that because the value of (APTS+M) has a later time stamp than does the VPTS, the video lags the audio. If played on a multimedia system, the user may visualize an earlier frame of video and hear the audio of a later frame of video, such as illustrated by frame 321L and frame 331M of FIG. 3C. Thus it may be desirable to jump or skip frames of video to age the video frame to substantially match the audio.

The value of N similarly normalizes the preceding VPTS 307 to enable a comparison of (VPTS+N) with the following APTS 312. In cases where the video lags the audio and exceeds a time drift threshold, it may be desirable to have the display of video substantially match the audio by skipping frames of video data or fractions thereof.

Using whole frames to skip or repeat may be preferable for reducing circuit complexity as a video display leading or lagging audio playback by fractions of a frame may not be perceptible.

Thus the calculation of VPTS−(APTS+M) may be performed if VPTS may be greater than the normalized APTS value or the calculation of (APTS+M)−VPTS may be performed if VPTS may be smaller than the normalized APTS value. Similarly, the calculation of APTS−(VPTS+N) may be performed if APTS may be greater than the normalized VPTS value or the calculation of (VPTS+N)−APTS may be performed if APTS may be smaller than the normalized VPTS value for cases where N may be used. In either case, it may be desirable after determining the results of these two operations to determine how many frames or fractions of frames the video display leads or lags the audio playback. The number of frames may be determined by comparing the results of the calculations to predetermined time drift thresholds. A time drift threshold may represent a frame time or fraction thereof in the number of SCLK clock cycles within a given number of frames or fractions thereof for a given display rate.

In particular, time drift thresholds of plus and minus one half frame time, one frame time, two and one half (2.5) frame times, and three frame times may be of interest. As discussed above, one half frame time was determined to be 1500 SCLK clock cycles, one frame time was 3000 SCLK clock cycles, 2.5 frame times was 7500 SCLK clock cycles, and 3 frame times was 9000 SCLK clock cycles for a display rate of 30 fps. For a display rate of 60 fps, these time drift threshold values may be cut in half to become 750, 1500, 3750, and 4500 SCLK clock cycles respectively. It can be appreciated that other threshold values may be selected without departing from the spirit and scope of the present invention.

Figure 4B:
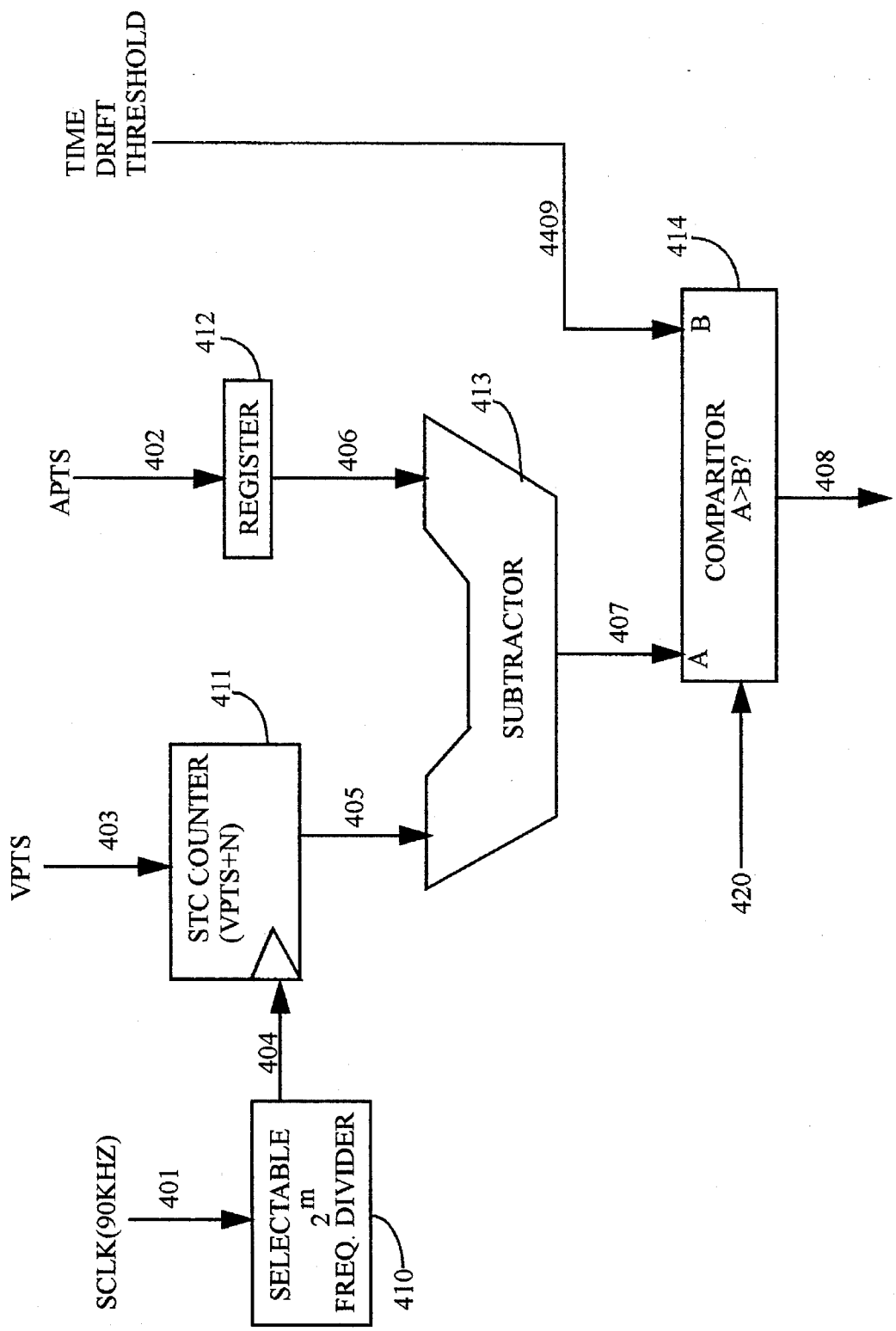
FIG. 4B illustrates a simplified block diagram for logic of a second embodiment of the present invention.
Figure 4C:
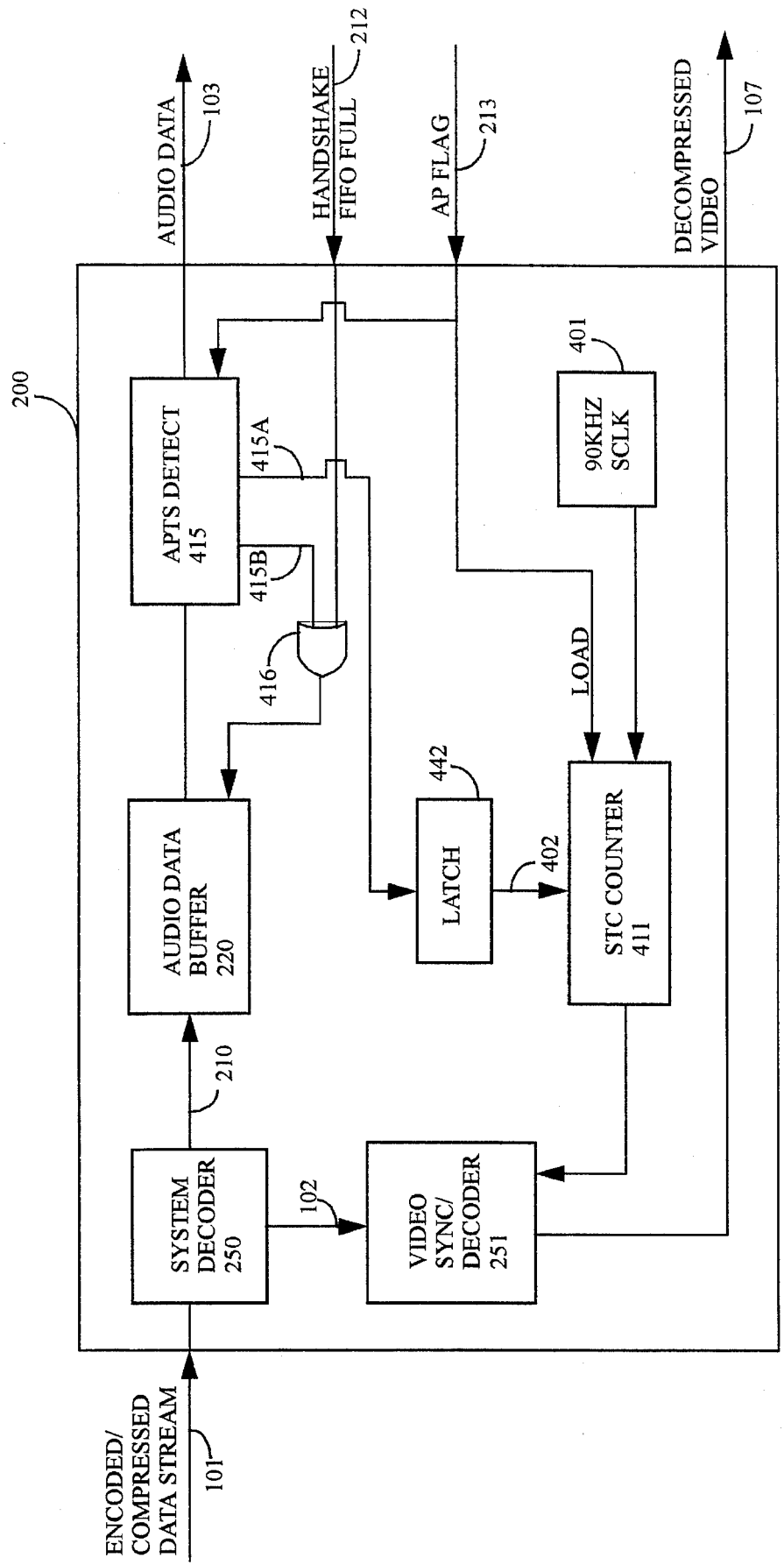
FIG. 4C is a block diagram of the vidsyst decoder of the present invention.

FIG. 4A illustrates a functional block diagram of circuitry for performing the computations of VPTS−(APTS+M) if VPTS may be greater than (APTS+M) and (APTS+M)−VPTS if VPTS may be smaller than (APTS+M) as well as the comparison of the results against various time drift threshold values. FIG. 4B illustrates a functional block diagram of circuitry for performing the computations of APTS−(VPTS+N) if APTS may be greater than (VPTS+N) and (VPTS+N)−APTS if APTS may be smaller than (VPTS+N). In comparing the time drift threshold against the results of these computations, logically the coarser frame time resolutions (time drift thresholds) such as plus and minus 3 frame times should be computed first and the finest frame time resolution (time drift thresholds) such as plus and minus one half frame time should be computed last.

FIG. 4A illustrates a functional block diagram of circuitry for performing the computations of VPTS−(APTS+M) if VPTS is greater than (APTS+M) and (APTS+M)−VPTS if VPTS is smaller than (APTS+M) as well as the comparison of the results against various time drift threshold values. FIG. 4B illustrates a functional block diagram of circuitry for performing the computations of APTS−(VPTS+N) if APTS is greater than (VPTS+N) and (VPTS+N)−APTS if APTS is smaller than (VPTS+N). In comparing the time drift threshold against the results of these computations, logically the coarser frame time resolutions (time drift thresholds) such as plus and minus 3 frame times should be computed first and the finest frame time resolution (time drift thresholds) such as plus and minus one half frame time should be computed last.

Referring to FIG. 4A, when an APTS is detected within the encoded/compressed data stream the STC counter 411 may be set and loaded with a binary value representing the detected APTS at counter input 402. Depending upon how the STC counter 411 counts, the SCLK clock frequency may be divided. Assuming that the STC counter 411 counts by one, such that the SCLK frequency of 90 khz on line 401 may be divided by one in frequency divider 410 generating the same frequency for the counter clock input 404. As the STC counter 411 is incremented, the value for M may be being generated. Upon reaching a VPTS, the generation of M for the detected VPTS may be completed and the counter output 405 reflects the computation of (APTS+M). When a VPTS is detected within the encoded/compressed data stream, the register 412 may be loaded with the binary value representing the detected VPTS at register input 403. The subtracter 413 computes (APTS+M)−VPTS from the value of (APTS+M) at subtracter input 405 and the value of VPTS at subtracter input 406. The results output from subtracter 413 on bus 407 are compared with the time drift threshold provided on bus 409 by comparator 414 at appropriate times by the comparator enable input signal 420. As discussed above, the coarse time drift thresholds are compared first such that the following sequence of equations may be performed by the comparator 414 for a display rate of 30 fps:

If $(APTS+M)-VPTS<-9000$ (A)

then video leads audio by at least 3 frames so repeat video frames and if not then If $(APTS+M)-VPTS>9000$ (B)

then video lags audio by at least 3 frames so skip video frames and if not then perform the next finer resolution steps If $(APTS+M)-VPTS<-7500$ (C)

then video leads audio by at least 2.5 frames but not more than 3 so repeat video frames and if not then If $(APTS+M)-VPTS>7500$ (D)

then video lags audio by at least 2.5 frames but not more than 3 so skip video frames and if not then perform the next finer resolution steps If $(APTS+M)-VPTS<-3000$ (E)

then video leads audio by at least one frame but not more than 2.5 so repeat video frames and if not then If $(APTS+M)-VPTS>3000$ (F)

then video lags audio by at least one frame but not more than 2.5 so skip video frames and if not then perform the next finer resolution steps If $(APTS+M)-VPTS<-1500$ (G)

then video leads audio by at least one half frame but not more than one frame so repeat video frames and if not then If $(APTS+M)-VPTS>1500$ (H)

then video lags audio by at least one half frame but not more than one frame so skip video frames and if not then perform the next finer resolution steps else stop if there are no more finer resolution steps and the actual time drift may be less than the last tested frame time of plus or minus one half frame.

For a display rate of 60 fps, the time threshold values are cut in half to determine the same results. For example, Eq. (A) would be modified to:

If $(APTS+M)-VPTS<-4500$. (A')

In general for FIG. 4A, the equations may be generally stated to be:

$|(APTS+M)-VPTS|<$time drift threshold (I)

For FIG. 4B, this equation may be modified to be:

$|(VPTS+M)-APTS|<$time drift threshold. (III)

Depending upon the results of these computations, the audio playback and the video display of images may be resynchronized by repeating or skipping video frames or fractions thereof or by skipping or delaying audio data packets or fractions thereof. However, a human may easily perceive skipped or repeated audio data.

In controlling the synchronization of audio and video, it appears that the time drift threshold of plus and minus one half frame may cause an A/V synch circuit to oscillate and continuously repeat or skip frames or fractions thereof. Thus, a time drift resolution of one frame may be preferable as the finest frame time resolution. The time drift resolution used in the above computations above may be not the same as skipping or repeating frames or fractions thereof (such as one half frame) during video image display and audio playback.

Referring again to FIG. 4B, when a VPTS may be detected within the encoded/compressed data stream, the STC counter 411 may be set and loaded with a binary value representing the detected VPTS at counter input 403. Depending upon how the STC counter 411 counts, the SCLK clock frequency may be divided. Assume for the moment that the STC counter 411 counts by one, such that the SCLK frequency of 90 khz on line 401 may be divided by one in frequency divider 410 generating the same frequency for the counter clock input 404. As the STC counter 411 may be incremented the value for N may be being generated. Upon reaching an APTS, the generation of N for the detected APTS may be completed and the counter output 405 reflects the computation of (VPTS+N). When an APTS may be detected within the encoded/compressed data stream, the register 412 may be loaded with the binary value representing the detected APTS at register input 402. Subtracter 413 computes (VPTS+N)–APTS from the value of (VPTS+N) at subtracter input 405 and the value of APTS at subtracter input 406.

The results output from subtracter 413 on bus 407 are compared with the time drift threshold provided on bus 409 by comparator 414 at appropriate times by the comparator enable input signal 420. As discussed above, the coarse time drift thresholds are compared first such that the following sequence of equations may be performed by the comparator 414 for a display rate of 30 fps:

If $(VPTS+N)-APTS<-9000$ (K)

then video lags audio by at least 3 frames so skip video frames and if not then

If $(VPTS+N)-APTS>9000$ (L)

then video leads audio by at least 3 frames so repeat video frames and if not then perform the next finer resolution steps If $(VPTS+N)-APTS<-7500$ (M)

then video lags audio by at least 2.5 frames but not more than 3 so skip video frames and if not then If $(VPTS+N)-APTS>7500$ (N)

then video leads audio by at least 2.5 frames but not more than 3 so repeat video frames and if not then perform the next finer resolution steps $$\text{If } (VPTS+N)-APTS<-3000 \qquad (O)$$

then video lags audio by at least one frame but not more than 2.5 so skip video frames and if not then $$\text{If } (VPTS+N)-APTS>3000 \qquad (P)$$

then video leads audio by at least one frame but not more than 2.5 so repeat video frames and if not then perform the next finer resolution steps $$\text{If } (VPTS+N)-APTS<-1500 \qquad (Q)$$

then video lags audio by at least one half frame but not more than one frame so skip video frames and if not then $$\text{If } (VPTS+N)-APTS>1500 \qquad (R)$$

then video leads audio by at least one half frame but not more than one frame so repeat video frames and if not then perform the next finer resolution steps else stop if there are no more finer resolution steps and the actual time drift may be less than the last tested frame time of plus or minus one half frame.

Referring now to FIGS. 4A and 4B, as discussed above, depending upon how the STC counter 411 counts, the SCLK clock frequency may be divided. If the STC counter 411 counts by 2, then the SCLK frequency of 90 khz on line 401 may be divided by two in frequency divider 410 generating one half the frequency of SCLK for the counter clock input 404. If the STC counter 411 were to count by 128, then the SCLK frequency of 90 khz on line 401 may be divided by 128 or $2^m$ where m=7 in frequency divider 410 generating $1/128$ the frequency of SCLK for the counter clock input 404.

In order to convert the functionality of the present invention into actual hardware, there are a number of desirable changes which may be made to the A/V sync circuit of FIGS. 4A and 4B in order for the A/V sync circuit to function in a single monolithic integrated circuit. Because there may be a system latency associated with the time required to decompress and decode the encoded/compressed data into decoded and decompressed video and audio data, the time to display the image on a screen, and the time to playback the audio data, the differences in system latency for audio and video may be taken into account. Thus the VPTS or APTS needs to be corrected for the system latency by adding or subtracting a frame time value from the VPTS or APTS. This may be stated as:

$$VPTS'=VPTS+AVLATENCY \qquad (III)$$

where AVLATENCY=VLATENCY−ALATENCY.

Alternately the APTS may be corrected to be $$APTS'=APTS+VALATENCY \qquad (IV)$$

where VALATENCY=ALATENCY−VLATENCY.

Thus various values of AVLATENCY and VALATENCY for different systems may be loaded into a register and added to either APTS or VPTS to acquire the corrected APTS or APTS' or the corrected VPTS or VPTS'. AVLATENCY and VALATENCY may be jointly referred to as AVLATENCY or simply system latency. Rearranging and reformulating equations (A) through (H) above we see for a display rate of 30 fps:

$$\text{If } (APTS+M)-(VPTS'-9000)<0 \qquad (1a)$$

then video leads audio by at least 3 frames so repeat video frames and if not then $$\text{If } (VPTS'+9000)-(APTS+M)<0 \qquad (2a)$$

then video lags audio by at least 3 frames so skip video frames and if not then perform the next finer resolution steps $$\text{If } (APTS+M)-(VPTS'-7500)<0 \qquad (3a)$$

then video leads audio by at least 2.5 frames but not more than 3 so repeat video frames and if not then $$\text{If } (VPTS'+7500)-(APTS+M)<0 \qquad (4a)$$

then video lags audio by at least 2.5 frames but not more than 3 so skip video frames and if not then perform the next finer resolution steps $$\text{If } (APTS+M)-(VPTS'-3000)<0 \qquad (5a)$$

then video leads audio by at least one frame but not more than 2.5 so repeat video frames and if not then $$\text{If } (VPTS'+3000)-(APTS+M)<0 \qquad (6a)$$

then video lags audio by at least one frame but not more than 2.5 so skip video frames and if not then perform the next finer resolution steps $$\text{If } (APTS+M)-(VPTS'-1500)<0 \qquad (7a)$$

then video leads audio by at least one half frame but not more than one frame so repeat video frames and if not then $$\text{If } (VPTS'+1500)-(APTS+M)<0 \qquad (8a)$$

then video lags audio by at least one half frame but not more than one frame so skip video frames and if not then perform the next finer resolution steps else stop if there are no more finer resolution steps and the actual time drift may be less than the last tested frame time of plus or minus one half frame.

For a display rate of 60 fps not only are the time threshold values cut in half but so may be the latency represented by the value AVLATENCY. Thus, APTS may be corrected to APTS" and VPTS may be corrected to VPTS". Equations Eq. (1a)–(6a) may be modified to Eq. (1b)–(8b):

$$(APTS+M)-(VPTS''-4500)<0 \qquad (1b)$$

$$(VPTS''+4500)-(APTS+M)<0 \qquad (2b)$$

$$(APTS+M)-(VPTS''-3750)<0 \qquad (3b)$$

$$(VPTS''+3750)-(APTS+M)<0 \qquad (4b)$$

$$(APTS+M)-(VPTS''-1500)<0 \qquad (5b)$$

$$(VPTS''+1500)-(APTS+M)<0 \qquad (6b)$$

$$(APTS+M)-(VPTS''-750)<0 \qquad (7b)$$

$$(VPTS''+750)-(APTS+M)<0 \qquad (8b)$$

Note that as the display rate changes, the time drift thresholds and the VPTS' and APTS' are modified in equations Eq. (1b)–(8b). In order to reduce circuit size, the time drift thresholds may be rounded to binary values from the ideal decimal values to a value referred to herein as an offset value.

Because the time stamp values are 33 bits wide, the counter and subtracter may have to be 33 bits wide as well. This may be undesirable in an integrated circuit as it would increase circuit size and the usage of silicon real estate. Instead, it may be desirable to truncate the 33 bit values to a width which may be more manageable.

Recall that the preferred system clock frequency recommended by the MPEG standard was 90 kilohertz or a period of 11.11 microseconds (us). Thus using the system of FIG. 4A described above where the frequency divider divides by one ($2^m=1$ where m=0), each count of the counter represents 11.11 us. Thus, the least significant bit of the APTS and VPTS time stamp values represents 11.11 us as well. The second LSB represents 22.22 us, the third LSB 44.44 us, the fourth LSB 88.88 us, and so on.

Recall that for 30 fps one half frame time was 1500 SCLK clock cycles which may be approximately 16.67 milliseconds, one frame time 3000 SCLK clock cycles or 33.33 ms, two and one half frame cycles 7500 SCLK clock cycles or 83.33 ms. FIG. 9 illustrates for the lower 18 bits of the 33 bit time stamps, certain patterns of time values of interest.

For the time drift thresholds of one half, one, two and one half, and three frame times the offset comparison values of plus and minus 1536, 3072, 7680, and 9216 are near approximations. Selecting these values allows truncation of the width of the offset comparison values to bits 9 through 13 because all the other upper and lower bits are zero. Thus, only 5 bit wide values and 5 bit wide storage registers for the offset comparison need be used in the design of the present invention. This modifies Eq. (1a)–(8a) to be respectively Eq. (9a)–(16a) as follows:

$$(APTS+M)-(VPTS'-9216)<0 \qquad (9a)$$

$$(VPTS'+9216)-(APTS+M)<0 \qquad (10a)$$

$$(APTS+M)-(VPTS'-7680)<0 \qquad (11a)$$

$$(VPTS'+7680)-(APTS+M)<0 \qquad (12a)$$

$$(APTS+M)-(VPTS'-3072)<0 \qquad (13a)$$

$$(VPTS'+3072)-(APTS+M)<0 \qquad (14a)$$

$$(APTS+M)-(VPTS'-1536)<0 \qquad (15a)$$

$$(VPTS'+1536)-(APTS+M)<0 \qquad (16a)$$

For a display rate of 60 fps where the corrected time drift values for one half, one, two and one half, and three frame times were respectively plus and minus 750, 1500, 3750, and 4500. From the table above the values of plus and minus 768, 1536, 3840, and 4608 may be substituted in order to truncate the number of required bits. Note that 768 may be extracted from 1536 by dividing by two which just shifts the value for 1536 one bit towards the LSB. Other values may be obtained in this manner as well in order to maintain the width of the offset value to 5 bits wide. Preferably a frequency divider may be used with Eq. (9a)–(16a) for a display rate a multiple or fraction of two from the display rate of 30 fps. The 60 fps equations modified from Eq. (1b)–(8b) are:

$$(APTS+M)-(VPTS''-4608)<0 \qquad (9b)$$

$$(VPTS''+4608)-(APTS+M)<0 \qquad (10b)$$

$$(APTS+M)-(VPTS''-3840)<0 \qquad (11b)$$

$$(VPTS''+3840)-(APTS+M)<0 \qquad (12b)$$

$$(APTS+M)-(VPTS''-1536)<0 \qquad (13b)$$

$$(VPTS''+1536)-(APTS+M)<0 \qquad (14b)$$

$$(APTS+M)-(VPTS''-768)<0 \qquad (15b)$$

$$(VPTS''+768)-(APTS+M)<0 \qquad (16b)$$

This technique may be applied to generate equations and values for 15 fps from the 30 fps equations by doubling the offset values which may be accomplished by shifting an offset value for 30 fps one bit towards the MSB. Alternately instead of shifting the offset value the division of the system clock by a variable frequency divider may use equations (9a)–(16a) for the proper display rate. The resultant equations for 15 fps are as modified from Eq. (9a)–(16a) are as follows:

$$(APTS+M)-(VPTS'''-18452)<0 \qquad (9c)$$

$$(VPTS'''+18452)-(APTS+M)<0 \qquad (10c)$$

$$(APTS+M)-(VPTS'''-15360)<0 \qquad (11c)$$

$$(VPTS'''+15360)-(APTS+M)<0 \qquad (12c)$$

$$(APTS+M)-(VPTS'''-6144)<0 \qquad (13c)$$

$$(VPTS'''+6144)-(APTS+M)<0 \qquad (14c)$$

$$(APTS+M)-(VPTS'''-3072)<0 \qquad (15c)$$

$$(VPTS'''+3072)-(APTS+M)<0 \qquad (16c)$$

The VPTS may be shown as being corrected to VPTS''' in Eq. (9c)–(16c) for the proper latency for a display rate of 15 fps. Alternately the value of APTS may be corrected to APTS'''. Note that the offset values for Eq (9c)–(16c) are double those of Eq. (9a)–(16a) and the offset values for Eq. (9b)–(16b) are one half those of Eq. (9a)–(16a). Thus, by using offset numbers selected for a display rate of 30 fps, other offset numbers may be generated for display rates which are a multiple or a fraction of two by shifting bits of the offset value left or right. If display rate may be not a multiple or fraction of two of 30 fps, then other offset numbers need to be loaded into the A/V sync circuit. Alternatively, by varying the division of the frequency of SCLK other display rates may be supported by a single set of equations such as Eq. (9a)–(16a).

For the logic of FIG. 4A and Eq (A)–(H), where VPTS may be subtracted from an incremented APTS value, Eq. (9a)–(16a), (9b)–(16b), and (9c)–(16c) are applicable. For the logic of FIG. 4B and Eq. (K)–(R), where APTS may be subtracted from an incremented VPTS value, Eq. (9a)–(16a), (9b)–(16b), and (9c)–(16c) may be modified to respectfully become Eq. (17a)–(24a), (17b)–(24b), and (17c)–(24c).

For a display rate of 30 fps:

$$(VPTS+N)-(APTS'-9216)<0 \qquad (17a)$$

$$(APTS'+9216)-(VPTS+N)<0 \qquad (18a)$$

$$(VPTS+N)-(APTS'-7680)<0 \qquad (19a)$$

$$(APTS'+7680)-(VPTS+N)<0 \qquad (20a)$$

$$(VPTS+N)-(APTS'-3072)<0 \qquad (21a)$$

$$(APTS'+3072)-(VPTS+N)<0 \qquad (22a)$$

$$(VPTS+N)-(APTS'-1536)<0 \qquad (23a)$$

$$(APTS'+1536)-(VPTS+N)<0 \qquad (24a)$$

For a display rate of 60 fps:

$$(VPTS+N)-(APTS''-4608)<0 \qquad (17b)$$

$$(APTS''+4608)-(VPTS+N)<0 \qquad (18b)$$

$$(VPTS+N)-(APTS''-3840)<0 \qquad (19b)$$

$$(APTS''+3840)-(VPTS+N)<0 \qquad (20b)$$

$$(VPTS+N)-(APTS''-1536)<0 \qquad (21b)$$

$$(APTS''+1536)-(VPTS+N)<0 \qquad (22b)$$

$$(VPTS+N)-(APTS''-768)<0 \qquad (23b)$$

$$(APTS''+768)-(VPTS+N)<0 \qquad (24b)$$

For a display rate of 15 fps:

$$(VPTS+N)-(APTS'''-18452)<0 \qquad (17c)$$

$$(APTS'''+18452)-(VPTS+N)<0 \qquad (18c)$$

$$(VPTS+N)-(APTS'''-15360)<0 \qquad (19c)$$

$$(APTS'''+15360)-(VPTS+N)<0 \qquad (20c)$$

$$(VPTS+N)-(APTS'''-6144)<0 \qquad (21c)$$

$$(APTS'''+6144)-(VPTS+N)<0 \qquad (22c)$$

$$(VPTS+N)-(APTS'''-3072)<0 \qquad (23c)$$

$$(APTS'''+3072)-(VPTS+N)<0 \qquad (24c)$$

Referring back to FIG. 4C, vidsyst decoder 200 may include system decoder 250 which receives encoded/compressed data stream 101. System decoder 250 may separate audio and video data and direct compressed/coded audio data 210 to audio data FIFO 220. Audio data FIFO 220 may then pass compressed/coded audio data 210 through APTS detector 415 to audio decoder 201 of FIG. 2A as serialized audio data 103. Serialized audio data 103 may be transmitted to audio decoder 201 asynchronously or synchronously. In the preferred embodiment, serialized audio data 103 may be transmitted synchronously, along with a data clock signal (not shown).

APTS detector 415 detects the presence of audio presentation time stamps in compressed/coded audio data stream 210. Audio presentation time stamps may be readily detected within compressed/coded audio data stream 210 due to the characteristic bitstream of the APTS. Although APTS detector 415 is shown in FIG. 4C as a separate element at the output of audio FIFO 220, APTS detector 415 may also be provided incorporated into system decoder 250 without departing from the spirit or scope of the present invention. APTS detector 415 detects the presence of a first audio presentation time stamp (APTS) and outputs the detected APTS 415a to latch 442. A detected APTS also remains in the compressed/coded audio data stream and may be output to audio decoder 201 in serialized audio data stream 103.

APTS detector 415 outputs a signal 415b when a second APTS is detected in the audio data stream. Signal 415b is ORed with a FIFO full handshake signal 212 received from audio decoder 201 (shown FIG. 4D) through OR gate 416 to prevent further audio data from being transferred to audio decoder 201 until audio data corresponding to the detected APTS had been decompressed/decoded by audio decoder 201 as indicated by receipt of AP flag 213.

Figure 4D:
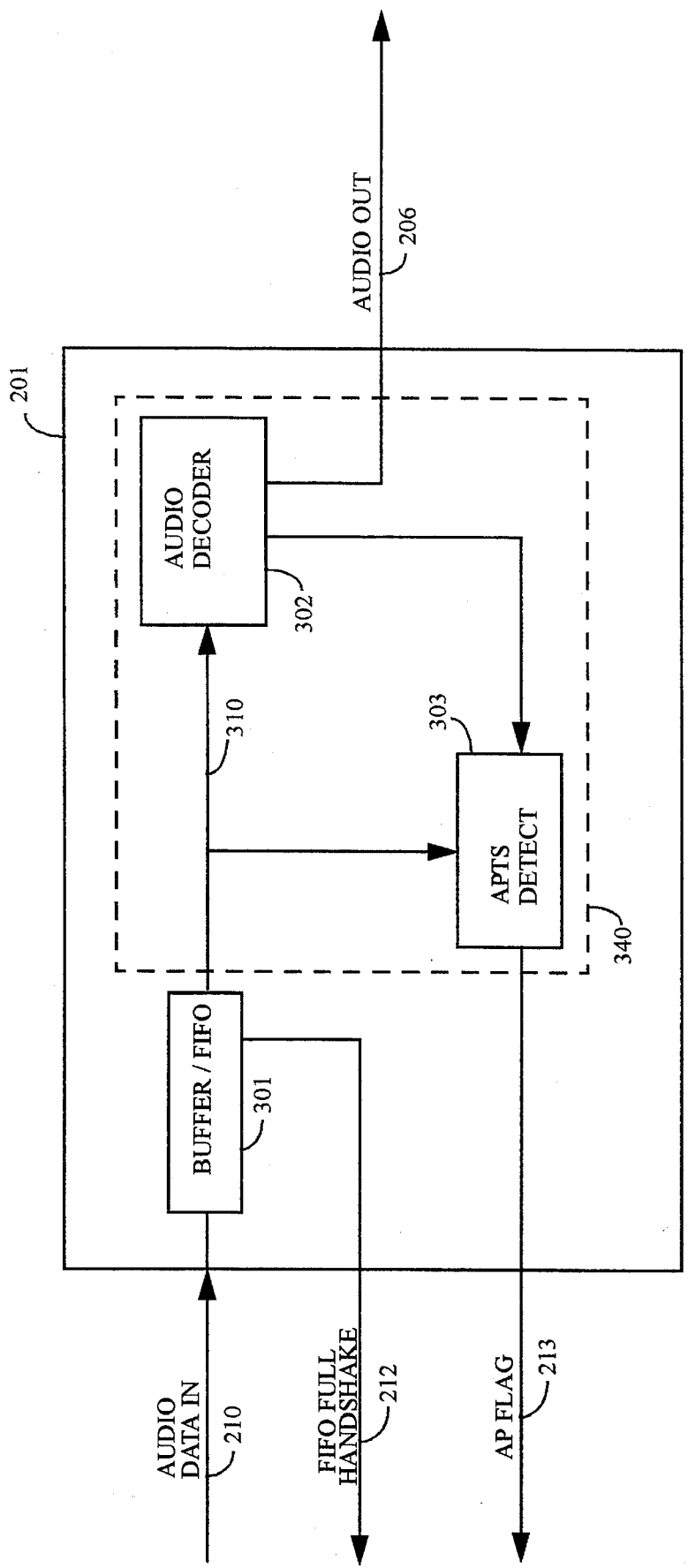
FIG. 4D is a block diagram of the audio decoder of the present invention.

FIG. 4D is a block diagram of audio decoder 201 of FIG. 2A. In the preferred embodiment, audio decoder 201 may comprise, for example, multi-standard audio decoder/DAC model CS4920 manufactured by Crystal Semiconductor Corporation of Austin, Tex., the preliminary product specification of which (dated October 1993) is incorporated herein by reference. Such a decoder may be provided with a general purpose DSP, on-board RAM and a serial control port (not shown). In practice, the audio decoder may be programmed through its serial control port to operate in the manner described herein. Alternately, a custom or semi-custom version of such a decoder (or similar decoder) may be provided to perform the functions described herein.

As shown in FIG. 4D, serialized audio data 103 may be received in buffer/FIFO 301 in audio decoder 201. Buffer/FIFO 301 may comprise a shift-in buffer for receiving sixteen bit data along with a sixteen bit wide FIFO for outputting sixteen bit data words to audio decoder 302. For the sake of illustration, the two elements are shown here as buffer/FIFO 301. Although buffer/FIFO 301 is disclosed as receiving sixteen-bit data words, other size buffers and FIFOs may be utilized to received data words of other lengths without departing from the spirit and scope of the invention.

FIFO full handshake signal 212 controls the flow of serialized audio data 103 from audio data FIFO 220 in vidsyst decoder 200 to prevent underflow or overflow of buffer/FIFO 301. Data 310 from buffer/FIFO 301 may then be presented to audio decoder 302 and audio presentation time stamp detector 303. Audio decoder 302 decodes audio data 310 received from buffer/FIFO 301 and outputs a decompressed/decoded audio signal 260. In the preferred embodiment, the decompression and decoding of audio data 310 from shift-in buffer 301 may be performed continuously, and the audio data may not be repeated or skipped to correct for timing deficiencies between output audio and video signals.

Presentation time stamp detector 303 detects the presence of an audio presentation time stamp (APTS) in audio data stream 310. and sets AP flag 213 high for a predetermined period (i.e., number of clock cycles) when corresponding audio is decompressed/decoded in audio decoder 302. As audio data 310 is continuously decoded, AP flag 213 may be effectively set whenever a particular portion of audio data has been presented (or decoded) as indicated by the presence of an audio presentation time stamp (APTS) in audio data stream 310.

As noted above, audio decoder 201 may comprise a model CD4920 audio decoder, suitably programmed to detect audio presentation time stamp (APTSs) within audio data stream 310. In operation, APTS detector 303 and audio decoder 302 may comprise portions of the overall audio decoder 340, as shown by the dashed line in FIG. 4D. Such a model CS4920 audio decoder may be suitably programmed to output AP flag 213 on an unused pin (e.g., pins 8–16, 30, 32, 35, or 37). Thus, the audio decoder portion of the present invention may be implemented without the use of a custom or semi-custom ASIC or dedicated decoder. However, a suitably modified or designed audio decoder may be provided to detect the presence of audio presentation time stamps (APTS) and output an AP flag 213 as described above, without departing from the spirit and scope of the invention.

Figure 4E:
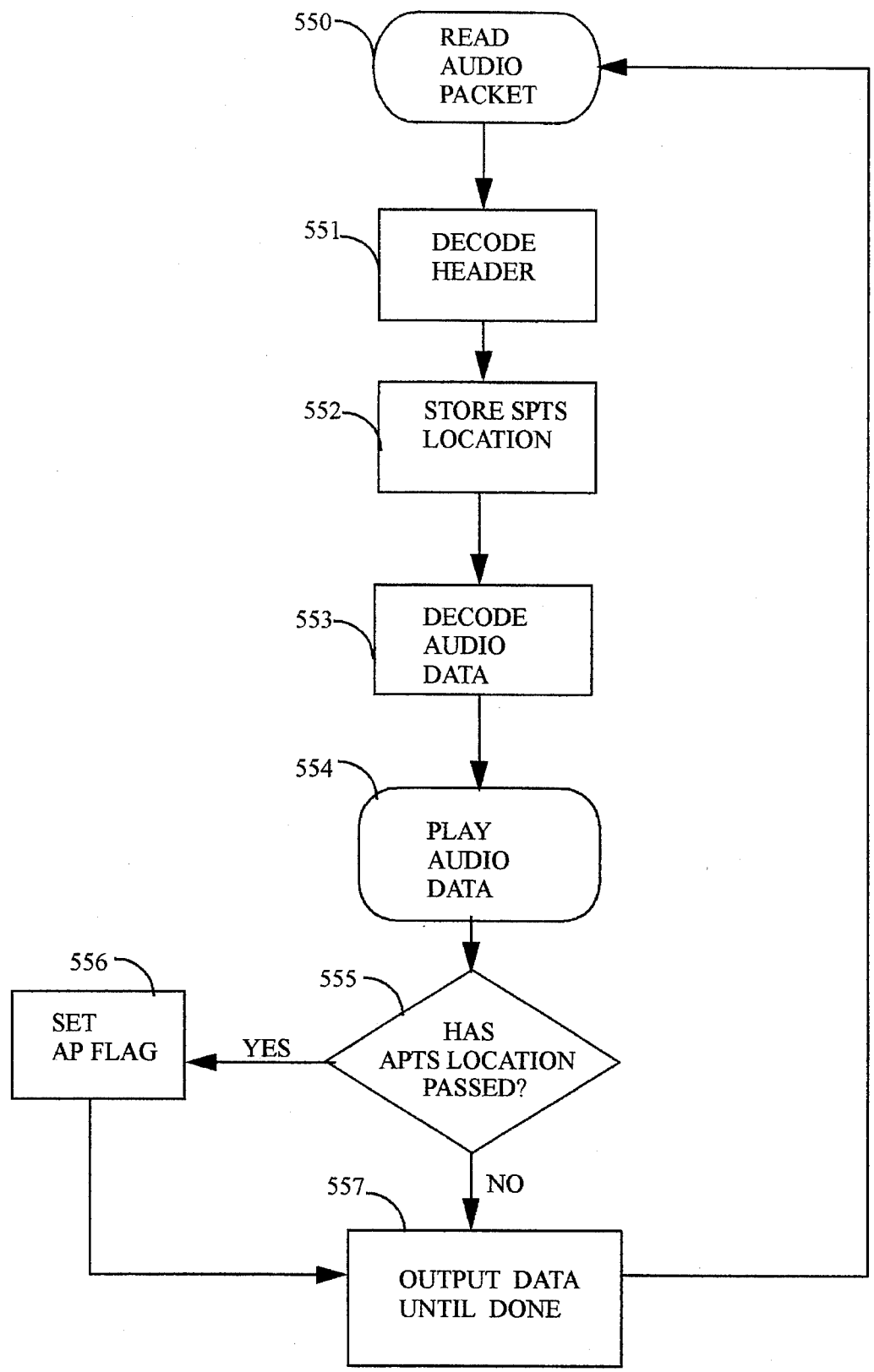
FIG. 4E is a flow chart illustrating the programming of the audio decoder of FIG. 4D.

FIG. 4E is a flowchart depicting the operation of the software loaded into audio decoder 201 for detecting audio presentation time stamps and setting AP flag 213. In step 550, an audio packet may be read by audio decoder/APTS detector 340 which decodes the header information in step 551. From the header information, an APTS may be detected (if present) and stored in APTS detector 303 in step 552. Audio decoder 302 decodes/decompresses the audio data in step 553 and outputs decompressed/decoded audio data 260 in step 554.

In step 555, a comparison may be made to determine whether the time represented by the APTS stored in APTS detector 303 has passed (i.e., corresponding audio data has been decoded/decompressed and played). If corresponding time location has passed, AP flag 213 may be set in step 556 and the remainder of the audio data may be output in step 557. If the APTS location has not been passed, the remainder of the audio data in the buffer may be decoded/decompressed and output, and processing returns to step 550.

Referring back to FIG. 4C, AP flag 213 may be received by STC counter 411 as a load signal to load the APTS stored in latch 442. STC counter 411 then begins counting, driven by SCLK 401 to determine the time difference (if any) between corresponding APTS and VPTS. SCLK 401 may be suitably divided as shown, for example, in FIG. 4A. For the sake of illustration, such dividing circuitry is not shown here. Similarly, APTS value loaded into latch 442 may be normalized by adding the latency values M as discussed above in connection with FIG. 4A. As discussed above, in the preferred embodiment, the audio data may be decoded/decompressed continuously and may not be repeated or skipped. Thus, the STC counter of FIG. 4C may be preferably configured in a manner similar to that of FIG. 4A. Similarly, the sync portion of video/sync decoder 251 may be configured, in the preferred embodiment, in a manner similar to that shown in FIG. 5A.

Thus, vidsyst decoder 200 internally obtains an APTS to initialize STC counter 411, and APTS data need not be sent from audio decoder 201 to vidsyst decoder 200. In the preferred embodiment, audio decoder 201 may have at most only one APTS in buffer/FIFO 301 at any given time, as output from audio data buffer 220 may be suspended upon detection of a second APTS 415b in data stream 103 by APTS detector 415. In this manner, it may be insured that an APTS loaded into latch 442 may be the same APTS detected by APTS detector 303. One advantage of this technique is the APTS detected by audio decoder 201 need not be communicated back to vidsyst decoder 200, the number of signals and/or signal lines between the devices may be reduced. Further, the technique of the present invention allows for a multi-standard audio decoder, such as the Crystal Semiconductor CS4920, to be used with the vidsyst decoder 200 of the present invention with only modification to software.

In addition to playback of audio and video at nominal speeds, it may be desirable to provide an MPEG playback system in which either audio or video may be played back at other than nominal speeds. For example, in some multimedia software applications, playback of MPEG video or the like may be controlled through the use of icons arranged in a similar manner to a VCR control. Thus, for example, it may be desirable to provide fast forward, pause, and step control for the playback of MPEG video or the like.

The latter of these, step control, may be provided such that a user may step through a video sequence on a frame by frame (or field by field) basis. In such a scenario, it may be desirable to mute the audio playback until nominal video playback is resumed. When nominal video playback is resumed, it may be desirable to resume audio playback in synchronization with the video playback.

In the embodiment of FIGS. 2A and 4A–C, synchronization of audio and video playback may be determined on an audio-dependent basis. Audio data packets are decoded on a continuous basis, and the corresponding video may be decoded in synchronization with the audio. When using a step control, such a synchronization technique may not be applicable. Further, in order to resynchronize the audio and video after leaving step control, additional circuitry and/or software may be required to re-establish audio and video synchronization.

Figure 2B:
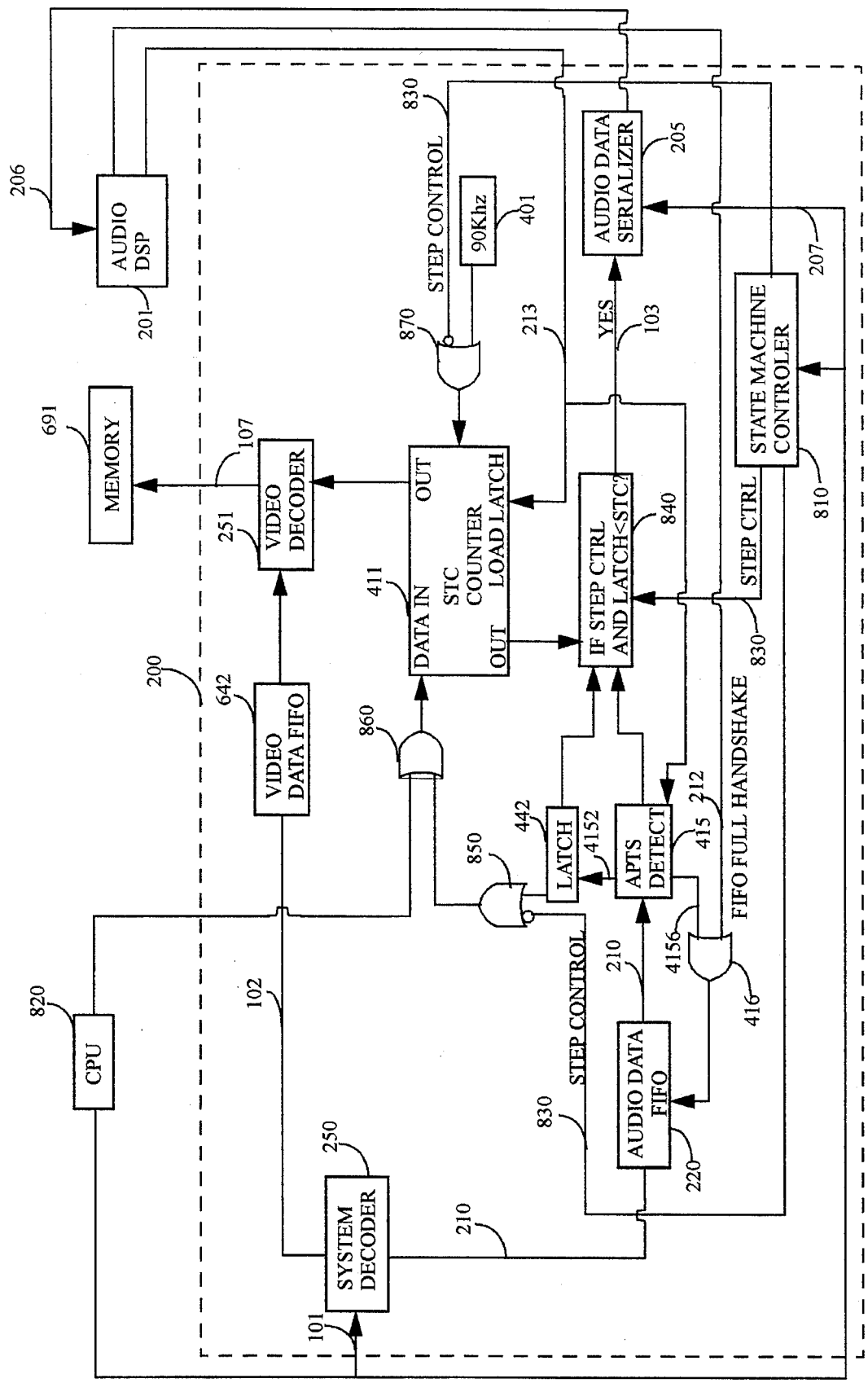
FIG. 2B is an expanded block diagram of the MPEG decoding system of FIG. 2A including the step control circuit and algorithm of the present invention.

FIG. 2B is a block diagram of a modified version of the vidsyst decoder of FIG. 2A showing the operation of the preferred embodiment of the present invention. The block diagram of FIG. 2B incorporates elements from FIGS. 2A and 4A, and includes additional elements to implement the step control of the present invention. As in FIGS. 2A and 4A, encoded/compressed data stream 101 may be received in system decoder 250 via CPU 820 and separated into compressed/encoded audio data 210 and compressed/encoded video data 102.

Compressed/encoded audio data 210 may be fed to audio data FIFO 220, where audio data packets and presentation time stamps are stored. Audio data FIFO 220 may then pass compressed/coded audio data 210 through APTS detector 415 to audio data serializer 205 as audio data 103. Serialized audio data 206 may be transmitted to audio decoder 201 asynchronously or synchronously. In the preferred embodiment, serialized audio data 206 may be transmitted synchronously, along with a data clock signal (not shown) through audio data serializer 205. Audio data serializer 205 interfaces vidsyst decoder 200 with audio decoder 201. In addition to serializing audio data and presentation time stamps, audio data serializer 205 may also transmit programming information or other control information to audio decoder 201 including control information received from CPU 820 through control line 207. As discussed above, audio controller 201 may comprise, in the preferred embodiment, a multi-standard audio decoder/DAC model CS4920 manufactured by Crystal Semiconductor Corporation of Austin, Tex. Such a decoder may be provided with a general purpose DSP, on-board RAM and a serial control port. In practice, the audio decoder may be programmed through its serial control port to operate in the manner described herein. Alternately, a custom or semi-custom version of such a decoder (or similar decoder) may be provided to perform the functions described herein.

In vidsyst decoder 200, APTS detector 415 detects the presence of audio presentation time stamps in compressed/ coded audio data stream 210 and outputs a detected APTS to latch 442. Audio presentation time stamps may be readily detected within compressed/coded audio data stream 210 due to the characteristic bitstream of the APTS. Although APTS detector 415 is shown in FIG. 2B as a separate element at the output of audio FIFO 220, APTS detector 415 may also be provided incorporated into system decoder 250 without departing from the spirit or scope of the present invention. APTS detector 415 detects the presence of a first audio presentation time stamp (APTS) and outputs a detected APTS 415a to latch 442. An APTS also remains in the compressed/coded audio data stream and may be output to audio decoder 201 in serialized audio data stream 206.

In addition to the components of FIGS. 2A and 4A, the embodiment of FIG. 2B includes state machine controller 810. State machine controller 810 may be provided as an input from external CPU 820, or may be provided as a separate control within vidsyst decoder 200. External CPU 820 may comprise, for example, the central processing unit of a personal computer (e.g., IBM™ or Macintosh™ compatible PC or the like). State machine controller 810 may output step control signal 830 when step control (i.e., frame by frame viewing) is desired. CPU 820 may output a mute command through control line 207 to audio data serializer 205. Audio data serializer 205 may transmit such a mute command to audio DSP 201 to mute the output of audio DSP 201 when step control is activated. Alternately, a command (not shown) from state machine controller 810 may output a signal through audio data serializer 205 to mute audio DSP 201. When a muting command is received by audio data serializer 205, appropriate programming control signals may be sent to audio controller 201 so as to reprogram audio decoder 201 so as to mute the output of audio decoder 201. The audio output of audio controller 201 may also be readily muted by deactivating the digital to analog conversion (DAC) portion of audio controller 201. Of course, other mute controls may be provided within the spirit and scope of the present invention.

State machine controller 810 also outputs step control signal 830 to audio data output control 840 when step control is selected by a command from CPU 820. Audio output control 840 may be provided from appropriate combinational logic circuitry or software. During nominal playback, audio output control 840 passes audio data and time stamps from APTS detector 415 to audio decoder 201 through audio data serializer 205 without impediment. When audio output control 840 is activated by step control signal 830, a comparison may be made between the audio presentation time stamp detected by APTS detector 415 and contained in APTS latch 442 with the contents of STC counter 411. If the audio presentation time stamp detected in APTS detector 415 is less than the current contents of STC counter 411, serialized audio data 206 may be passed to audio decoder 201. Thus, only audio data corresponding to a playback time less than the current video frame may be passed to audio decoder 201.

State machine controller 810 also outputs step control signal 830 to an inverted input of AND gate 850. Thus, the output of latch 442 may be fed to STC counter through AND gate 850 when step control is not activated. The output of AND gate 850 may be fed to OR gate 860, which also receives an input from CPU 820. When step control is activated, the start count output from latch 442 may be suppressed by the action of AND gate 850. Start count for STC counter 411 may be received from CPU 820, which outputs a start count for a time corresponding to a video frame to be viewed in step mode.

In order to freeze the video frame in step mode, the output of 90 Khz clock 401 may be suppressed by AND gate 870. AND gate 870 receives as one input the 90 Khz clock 401 (or a suitable division thereof). An inverted input of AND gate 870 receives step control signal 830 from state machine controller 810. Note that here, step control signal 830 is shown as going high when step control is activated. Of course, other logic level arrangements may be used without departing from the spirit and scope of the invention. It should also be noted that AND gates 850 and 870 and OR gate 860 are shown here only for the purposes of illustrating the operation of the present invention. In the preferred embodiment, such combinational logic may be generated using appropriate software coding stored in a PROM or RAM of vidsyst decoder 200. In addition, the combinational logic circuitry shown in FIG. 2B may be replaced or combined with other suitable logic circuitry, software or the like without departing from the spirit and scope of the invention. For example, AND gates 850 and 870 may be replaced with MUXes or the like.

In operation, step control may be activated through CPU 820, through, for example, a graphical user interface (e.g., "step", "pause" or "jog" icon). For example, CPU 820 may operate software to read MPEG encoded/compressed data from CDROM, broadcast, cable, or other data source and display and play video and audio data on a display and speakers, respectively. Such software may include control icons similar to a VCR (e.g., Play, Stop, Fast-Forward, Rewind, Pause). In addition, such software may include video editing icons (e.g., jog shuttle or the like) to step through a video presentation on a frame by frame basis.

Once step control has been activated, CPU 820 may send a signal to state machine controller 810 which may output step control signal 830. CPU 820 may then output an STC start count time through OR gate 860 to STC counter 411. As noted above, the operation of the video decoder 251 may be synchronized with the output of STC counter 411. When step control is activated, the clock input to STC counter may be interrupted and thus the output of STC counter may remain the start count received from CPU 820.

CPU 820 may provide an STC start count to STC counter 411 corresponding to a video frame to be displayed. For MPEG video it may be preferred to view video frames in sequential order, as frames of video data may be generated for preceding frames. It may be possible, within the spirit and scope of the present invention to provide for reverse stepping through an MPEG encoded/compressed video signal by selectively displaying the I-frame closest to the STC start count time output from CPU 820.

In order to step through a video on a frame by frame basis, CPU 820 may output to STC counter 411 a series of start count times corresponding to individual frames. For example, as a user clicks on a step icon, an incremented STC start time value may be sent from CPU 820 to STC counter 411 through OR gate 860. The STC start time value would be incremented by a value dependent on the frame rate of the MPEG video signal. For example, for a data stream having a frame rate of 30 frames per second, the STC start count time may be incremented in 1/30th second values to step from frame to frame. Other frame rates may use different increment values.

A user may step through a number of frames in sequence or skip though a series of frames. As successive frames of video data are stepped, audio data corresponding to the video frame passes through audio data output control 840, through audio data serializer 205 to muted audio controller 201. When a user has completed desired stepping of video, for example, by clicking on a "play" icon, processing of video and audio data returns to nominal playback mode discussed above, with video decoding being synchronized with the playback of audio. During step control, audio data corresponding to stepped video frames may be passed through to audio decoder 201 which has been muted. Thus, when nominal playback is resumed, the audio and video data streams are substantially synchronized. Full synchronization of audio and video data may then be performed as discussed above in connection with FIGS. 4A-E.

Figure 5A:
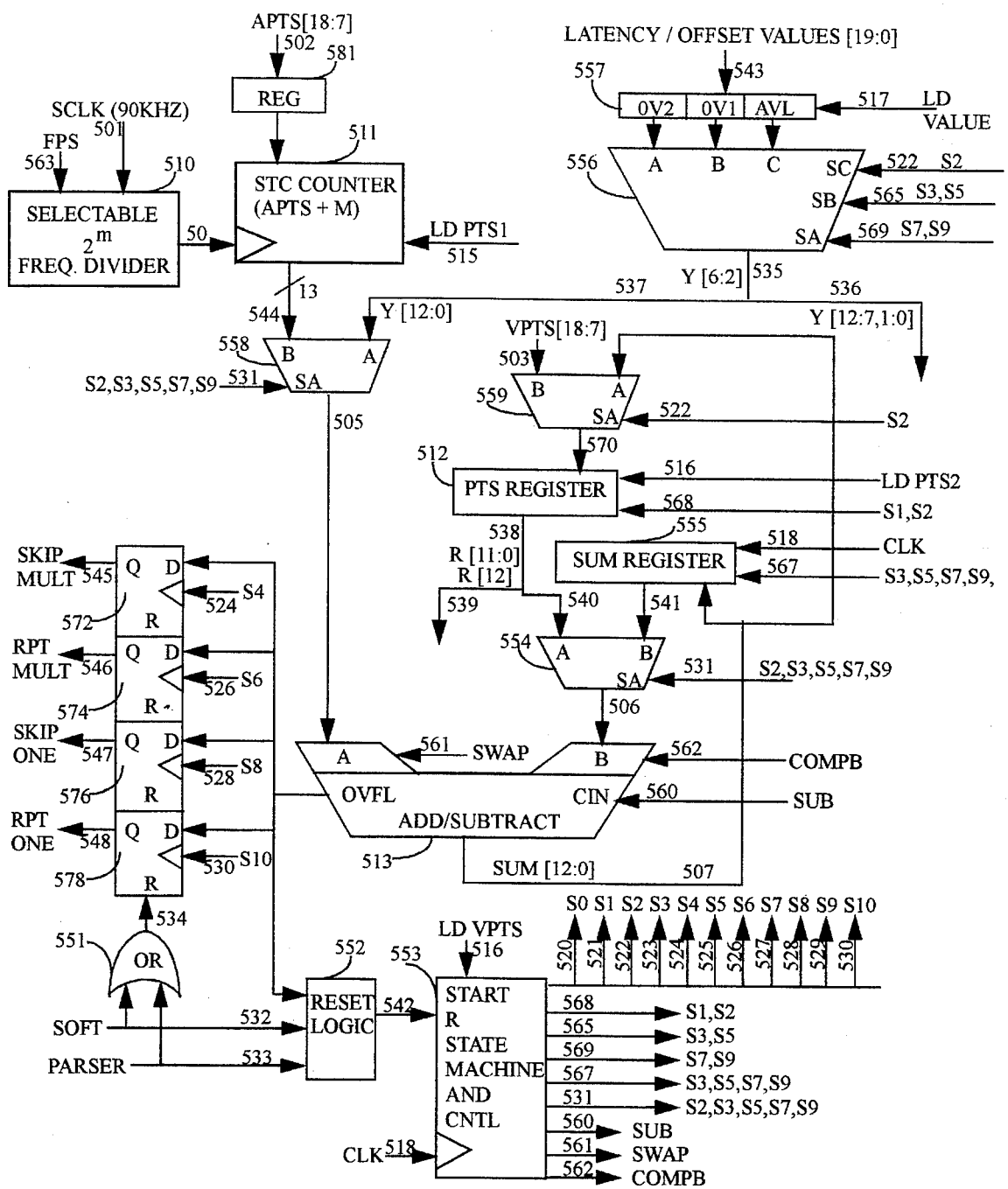
FIG. 5A illustrates a detailed block diagram of the logical circuitry of the preferred embodiment of the present invention.
Figure 5B:
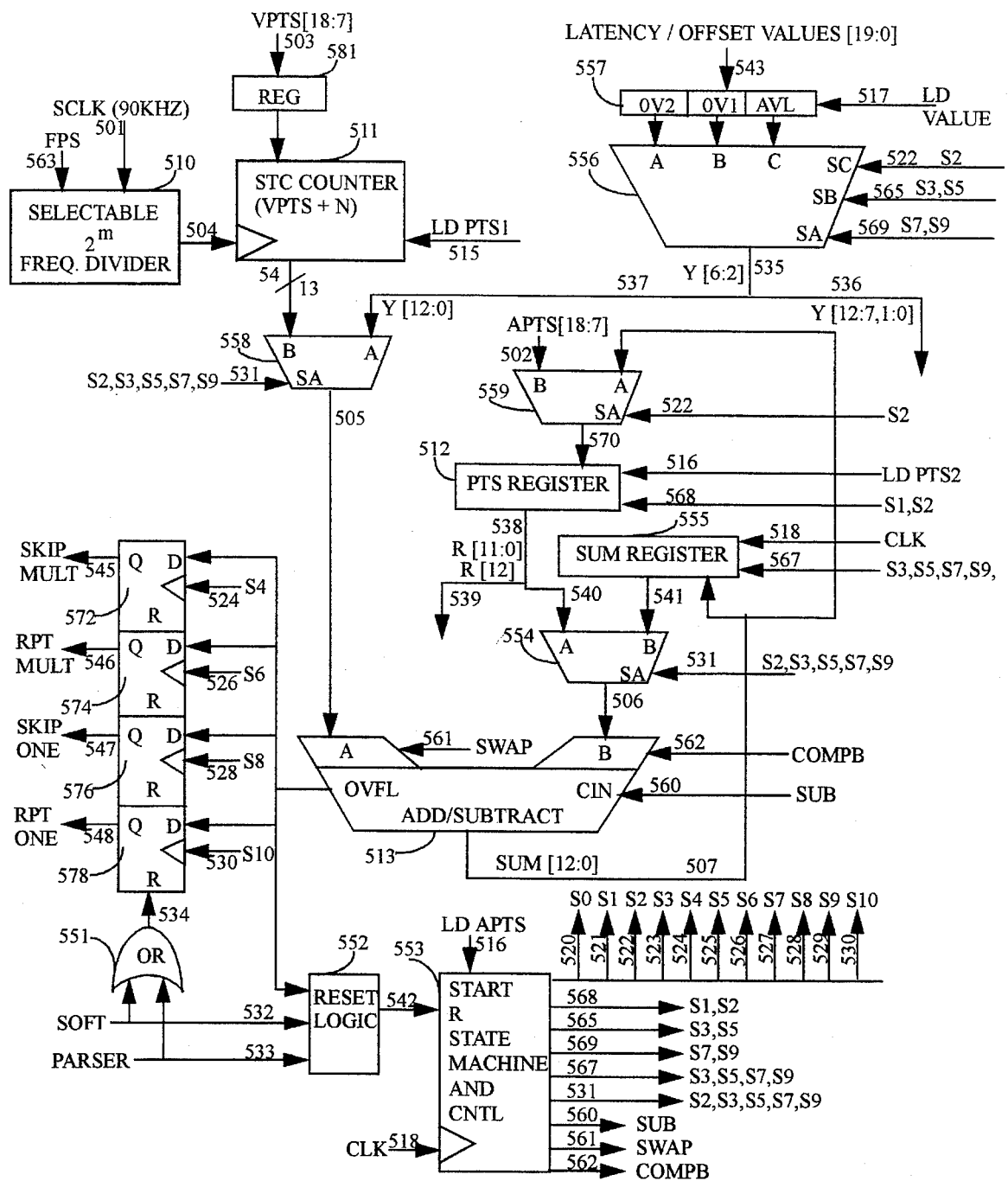
FIG. 5B illustrates a detailed block diagram of the logical circuitry of a second embodiment of the present invention.

FIG. 5A illustrates an A/V Sync Circuit, similar in functionality to that of FIG. 4A, which may use four of the eight equations, Eq. (9a)-(16a). FIG. 5B illustrates an A/V Sync Circuit, similar in functionality to that of FIG. 4B, which may use four of the eight equations, Eq. (17a)-(24a). The operation of the circuit of FIG. 5B may be similar to the operation of the circuit of FIG. 5A. Accordingly much of the discussion which follows may be applicable to both circuits. Two offset values and an AVLATENCY value are loaded into register 577 at input 543 upon receiving the load value signal at input 517.

Truncating or rounding the time drift thresholds to obtain the offset values may reduce the data bus width for the remaining hardware in FIG. 5A when combined with the frequency divider 510. Shifting left or right to obtain a multiple or fraction of two of the stored offset value may be accomplished by the multiplexer 566. Preferably the frequency divider 510 may be used to obtain multiples of the offset value for the 30 fps equations as well as to support truncation which was briefly discussed with regards to the frequency divider 410 of FIG. 4A.

FIG. 9 and FIG. 5A illustrate the advantage of using the frequency divider in combination with the truncated corrected time drift thresholds referred to as offset values. Although the APTS and VPTS were described as being 33 bit values, however, in order to determine the desired maximum time drift range, not all most significant bits of the APTS and VPTS are required. For example, the 2nd MSB represents $2^{31} \times 11.11$ us which may be 6.625 hours while the 1st MSB indicates AM or PM. Thus, it may be not expected that the audio playback would be so far out of synchronization with the video playback. It may be expected that the audio and video may be out of synchronization in the range from 0 to three seconds which may be represented by bits 18 to 0.

Thus, bits 32 to 19 of both the APTS and VPTS values may be truncated. Also because resynchronization may be not expected for a time value less than 1.42 ms, which may be less than one tenth of a 60 fps frame, bits 6 to 0 of the APTS and VPTS values may be truncated as well. Thus, the desired range of bits to be analyzed for the APTS and VPTS values may be 18 to 7.

In FIG. 5A the truncated APTS [18:7] may be input into the counter 511 on bus 502 and the truncated VPTS [18:7] may be input into the register 512 on bus 503. Because of the truncation, the counter 511 may accordingly count to match the truncation as well as the appropriate display rate and given offset values. Considering only truncation, the counter should count by counts of $2^7$ (128). Thus, the selectable frequency divider 510 would divide SCLK frequency by 128 to provide the proper incrementation input to counter 511 at line 504. Thus, truncation of the widths of VPTS, APTS, and the corrected time drift thresholds may allow the use of smaller counters, adders, registers, busses and other hardware in order to provide an A/V Sync circuit having less circuitry.

To further reduce the amount circuitry consumed by the A/V sync circuit, a single adder/subtracter may be used in FIG. 5A to perform the operations of Eq. (9a)-(16a), Eq. (9b)-(16b), Eq. (9c)-(16c) or other similar equations for determining if the time drift has exceeded a threshold. If the result of the computation of one of the equations by the adder/subtracter in FIG. 5A results in an overflow condition, indicating a negative value, then the equation has been satisfied. Because APTS, VPTS, and the corrected time drift values were truncated, the adder/subtracter 513 may only require 12-bits. Of course, it can be appreciated that no truncation or other bits may be truncated to arrive at different data widths for APTS, VPTS, and the corrected time drift values, thereby requiring a different size adder/subtracter as well different sizes for other circuitry.

Now the operation of the A/V sync circuit of FIG. 5A will be described in detail assuming a display rate of 30 fps, time drift thresholds of plus and minus one and three frame times, with Eq. (9a)-(10a), (13a)-(14a) being applicable. The system may be initially reset upon receiving either a software reset or a reset from the parser within the system decoder. The system may also be reset when one of the resultant Eq. (9a)-(10a), (13a)-(14a) may be satisfied. In the case that the audio and video are out of synchronization by more frames than may be timely accommodated, an interrupt request may be sent to software such that the software may perform the resynchronization.

In the case where audio and video are out of synchronization and it may be desirable to skip a video frame, however a B-type frame has not been found within the compressed video data stream for a predetermined period of time, then an interrupt may be sent to the software as well in order that the software may cause a skip of a video frame or frames to synchronize the audio and video. In any case upon a reset condition, the reset logic 552 resets the state machine 553 to the IDLE state zero (S0) 520. The selectable frequency divider 510 divides the system clock to accommodate the truncation and a different frame rate.

If register 557 may be loaded with the values for a 30 fps display rate as depicted in Eq. (9a)-(10a), (13a)-(14a) and the actual received compressed bit stream matches the display rate of 30 fps, then the frequency divider divides by $2^7$ (128) to match the truncation only. However, if the values in register 557 remain being loaded with the values for Eq. (9a)-(10a), (13a)-(14a) and the actual received compressed bit stream may be of 60 fps, then the selectable frequency divider 510 divides by $2^6$ (64) in order to allow the counter 511 to count faster.

Changing the division of the selectable frequency divider 510 from $2^7$ (128) to $2^6$ (64), has the equivalent effect of dividing the offset values stored in register 557 in half such that Eq. (9b)-(10b), (13b)-(14b) may be effectively used by the circuit of FIG. 5A. Similarly, if the compressed bit stream may be of a display rate of 15 fps then the divider divides by 256 or $2^8$ in order to create the effect of multiplying the offset values stored in register 557 by two such that Eq. (9c)-(10c), (13c)-(14c) may be used.

The system during state zero (S0) 520 reads the appropriate offset values and latency value into register 557. Assume that time drift may be check to see if it exceeds the preferable time drift thresholds of plus and minus one frame time and plus and minus three frame times. The order of sequence of the equations may be slightly modified because it may be preferable to know first if encoded/compressed video frames may be skipped and then to know if decoded/decompressed video frame may be repeated. Thus, the order of computation of the equations may be as follows:

$$(VPTS'+9216)-(APTS+M)<0 \tag{10a}$$

$$(APTS+M)-(VPTS'-9216)<0 \quad (9a)$$

$$(VPTS'+3072)-(APTS+M)<0 \quad (14a)$$

$$(APTS+M)-(VPTS'-3072)<0 \quad (13a)$$

for a nominal display rate of 30 fps wherein VPTS may be modified by the AVLATENCY value to become VPTS'.

The offset values, which are truncated values, are loaded into register 577 in parallel with the AVLATENCY value from bits [19:0] of bus 543. For example, the offset value 9216 represented by the binary pattern 10010 from bits [13:9] of FIG. 9 may be loaded into the five bits [9:5] of register 557 marked OV1. The offset value 3072 represented by the binary pattern 001100 from bits [13:9] of FIG. 9 may be simultaneously loaded into the five bits [14:10] of register 557 marked OV2. The AVLATENCY value may be simultaneously loaded into the 5 bits [4:0] of register 557 marked AVL. The A/V sync circuit may wait in state 0 (520) to receive a first APTS value from the compressed data stream.

Upon the occurrence of the APTS, such as APTS 312 in FIG. 3A, the A/V sync circuit of FIG. 5A may initialize the counter 511 to the truncated APTS value which may be available on bus 502. SCLK executes $2^m$ clock cycles before the selectable frequency divider 510 allows counter 511 to increment from the initialized APTS value. In this case after 128 SCLK clock cycles are counted, the frequency divider 510 increments the counter 511. The counter 511 continually increments and may be reinitialized by the LD PTS1 signal 515 to a new APTS value after receipt of the new APTS value within the compressed data stream has been stored by register 581.

After the counter 511 has been incremented a number of times, a VPTS may be received in the compressed data stream, such as VPTS 308 in FIG. 3A, which causes the state machine 553 to jump to state 1 (S1) 521.

During state 1 a truncated VPTS value may be selected by multiplexer 559 to be loaded into the PTS register 512. The next step may be to correct VPTS to VPTS' by the Eq. (III) which may be repeated below:

$$VPTS'=VPTS+AVLATENCY. \quad (III)$$

A chip clock 518 increments the state machine 553 to the next state, state 2 (S2) 522, in order to perform Eq. (III). During S2 the AVLATENCY value stored in bits [4:0] of register 517 may be selected to pass through multiplexer 556 onto bits 6 to 2, Y[6:2] 535, of bus Y[12:0] 537. The remaining bits numbered 12 to 7 and 1 to 0, Y[12:7,1:0] 536, of bus Y[12:0] 537 are connected to ground in order to set bits 12 to 7 and 1 to 0 to a logical zero level.

During states 2, 3, 5, 7 and 9, signal 531 (S2,S3,S5,S7,S9) selects the bus Y[12:0] 537 to pass through multiplexer 558 onto bus 505 as input A of the adder/subtracter 513. Signal 531 (S2,S3,S5,S7,S9) also selects bus R[12:0] 540 to pass through multiplexer 554 and into input B of adder/subtracter 513 during states 2, 3, 5, 7 and 9. Register 512 drives the truncated value of VPTS, VPTS[18:7] which may be stored therein, onto bits 11 to 0, R[11:0] 538, of bus R[12:0] 540. During state 2 the truncated value of VPTS passes through multiplexer 554 and into input B on bus 506 of adder/subtracter 513. Adder/subtracter 513 may be an adder having the capability of performing subtraction using two's complement addition and the capability of swapping input A for input B and vice-versa.

During state 2 adder/subtracter 513 performs (AVLATENCY+VPTS) and drives bus SUM[12:0] 507 with the VPTS' value. The output, SUM[12:0] of adder/subtracter 513, may be stored in register 512 during state 2 and in register 555 during states 3, 5, 7, and 9. Thus, during state 2 the result of (AVLATENCY+VPTS)=VPTS' may be stored in register 512. Next the state machine 553 jumps to state 3 (S3) 523.

During state 3 (S3) 523 the first step in computing Eq. (10a) (VPTS'+9216)−(APTS+M)<0 may be performed to determine if the video lags the audio by more than 3 frame times. The value of (VPTS'+9216) may be generated while the counter holds the value of (APTS+M). During states 3 and 5, signal 565 (S3,S5) selects the offset value OV1 to pass through multiplexer 556 and onto bits 2 to 6 of Y[12:0] bus 537. Signal 531 selects Y[12:0] bus 537 to pass through multiplexer 558 onto bus 505 and into input A of adder/subtracter 513. The value of VPTS', stored in register 512, may be selected by signal 531 to pass through multiplexer 554 onto bus 506 and into input B of adder/subtracter.

Adder/subtracter control signals 560–562 cause the adder/subtracter to perform the function of A+B. Thus adder/subtracter 513 performs (9216+VPTS') and outputs the result on SUM[12:0] bus 507. The results on SUM[12:0] bus 507 are stored in register 555 during states 3, 5, 7, and 9 by chip clock 518 and signal 567 (S3,S5,S7,S9). Chip clock signal also causes the state machine to jump to the next state, state 4.

During state 4 (S4) 524, the final step of computing (VPTS'+9216)−(APTS+M)<0 of Eq. (10a) may be performed. During states 4, 6, 8, and 10 signal 531 selects the output of counter 511 to pass through multiplexer 558 onto bus 505 which may be input into input A of adder/subtracter 513. The output of counter 511 appears to be constant during the computations of the equations because the counter may be incremented by the output from the selectable frequency divider 510 while the rest of the A/V sync circuitry in FIG. 5A may be operating at the frequency of the system clock. Thus the counter output 544 should not have incremented from its value after the VPTS was received.

During states 4, 6, 8, and 10, signal 531 selects the output from register 555 to pass through multiplexer 554 onto bus 506 and into input B of adder/subtracter 513. During state 4 the value (9216+VPTS') may be input into adder/subtracter 513 as input B and the value (APTS+M) may be input into adder/subtracter 513 as input A. The adder/subtracter control signals 560–562 selects adder/subtracter 513 to perform the operation B−A. SWAP signal 561 may be active to swap A and B inputs and COMPB signal 562 may be active such that the adder/subtracter 513 complements and converts (APTS+M) into its twos complement form with the addition of SUB signal 560 at the carry input of adder/subtracter 513. The adder/subtracter 513 thereafter adds (VPTS'+9216) to −(APTS+M).

If the overflow output 549 of adder/subtracter 513 indicates an overflow condition during state 4 then Eq. (10a) has been satisfied and the display of video images lags the audio playback by at least 3 frames such that video frames or fractions thereof may be skipped to catch up to the latter audio playback time. If the computation does not result in an overflow condition, the state machine jumps to state 5 (S5) 525. Overflow output 549 may be stored into D flip flop 572 during state 4, D flip flop 574 during state 6, D flip flop 576 during state 8, and D flip flop 578 during state 10.

In an overflow condition, control signal output SKIP MULT 545 may signal other circuitry (not shown) to cause multiple skips of frames of video images, such as three frames in order to have the video images substantially match the audio playback. Alternately the control signal output 545 may cause the audio playback to be delayed by a number of frames while the video display of images catch up. However, this latter technique may be not preferable as changes in the audio playback are more noticeable to the human ear than changes in video images are to the human eye. Further, if the overflow condition exists, the overflow output 549 causes the state machine 553 to reset through the reset logic 552. Once one of the Eq. (9a), (10a), (13a), or (14a) has been satisfied, the A/V sync circuit of FIG. 5A need not perform the entire sequence of computations. Recall that if the computation of (VPTS'+9216)–(APTS+M) does not result in an overflow condition then the state machine 553 jumps to state 5.

During state 5 (S5) 523, computation of Eq. (9a) (APTS+M)–(VPTS'–9216)<0 may be begun to determine if the video leads the audio by more than 3 frame times. State 5 generates (VPTS'–9216). Control signal 565 (S3,S5) during state 5 selects an offset value stored in OV1 to pass through multiplexer 556 and onto bits 6 to 2 of bus Y[12:0] 537. Control signal 531 during state 5 selects bus Y[12:0] 537 to pass through multiplexer 558 and into input A of adder/subtracter 513. Control signal 531 during state 5 further selects bus R[12:0], having the truncated VPTS on bits 11 to 0, to pass through multiplexer 554 and into input B of adder/subtracter 513.

Adder/subtracter control signals 560–562 selects adder/subtracter 513 to perform the operation B–A. SWAP signal 561 may be active to swap A and B inputs and COMPB signal 562 may be active such that the adder/subtracter 513 complements and converts (9216) into its twos complement form with the addition of SUB signal 560 at the carry input of adder/subtracter 513. Thus, adder/subtracter 513 performs the addition of (VPTS+–9216) for which the result on bus 507 may be stored into register 555 during state 5. The state machine then jumps to state 6.

During state 6 (S6) 526 the computation of Eq. (9a) (APTS+M)–(VPTS'–9216)<0 may be completed. The value of (VPTS+–9216) may be subtracted from (APTS+M). Signal line 531 during state 6 selects the counter output bus 544 to pass through multiplexer 558 onto bus 505 which may be input into input A of adder/subtracter 513. Signal line 531 also selects the output from register 555 on bus 541 to pass through multiplexer 554 and onto bus 506 and into input B of adder/subtracter 513. The adder/subtracter control signals 560–562 selects adder/subtracter 513 to perform the operation B–A. SWAP signal 561 may be active to swap A and B inputs and COMPB signal 562 may be active such that the adder/subtracter 513 complements and converts (VPTS'+9216) into its twos complement form with the addition of SUB signal 560 at the carry input of adder/subtracter 513.

Adder/subtracter 513 performs the addition of –(VPTS'+–9216) to (APTS+N). If an overflow condition results by the addition of –(VPTS'+–9216) to (APTS+N), then Eq. (9a) has been satisfied and the video leads the audio by at least 3 frames. If no overflow condition exists, the state machine may jump to state 7.

In an overflow condition, the overflow output 549 may be stored in D flip flop 574 during state 6. Control signal output RPT MULT 546 may be generated signaling other circuitry (not shown) to repeat multiple frames of video images, such as three frames, in order that the video image may be held constant and the audio may catch up to the video. Alternately, control signal output 545 may cause the audio playback to skip a number of frames or data packets to catch the video display of images, however skipping audio data may be not preferable. Furthermore, in an overflow condition, the state machine 553 may be reset to state 0. Recall that if the computation of (APTS+M)–(VPTS'–9216) does not result in an overflow condition then the state machine jumps to state 7.

During state 7, (S7) 525, the computation of Eq. (14a) (VPTS'+3072)–(APTS+M)<0 may be begun to determine if video lags audio by more than the one frame time. During state 7 the value for (VPTS'+3072) may be generated. During state 7 and 9 the offset value OV2 from register 557 may be selected by signal 569 (S7,S9) to pass through multiplexer 556 onto bits 6 to 2 of bus Y[12:0] 537. Signal 531 selects the bus Y[12:0] 537 to pass through multiplexer 558 onto bus 505 and into input A of adder/subtracter 513. Signal line 531 during state 7 also selects bus R[12:0] 540, having the VPTS value stored in register 512 available on bits 11 to 0, to couple to bus 506 as input B of adder/subtracter 513. The adder/subtracter control signals 560–562 selects adder/subtracter 513 to perform the operation A+B. SWAP signal 561, COMPB signal 562, and SUB signal 560 are inactive so that adder/subtracter 513 may perform the addition of (VPTS'+3072). The resultant output on bus 507 may be stored in register 555 during state 7 by signal 567 and chip clock 518. Chip clock 518 also causes the state machine to jump to state 8.

During state 8 (S8) 528 the computation of Eq. (14a) (VPTS'+3072)–(APTS+M) may be completed. The value of (APTS+M) within counter 511 may be subtracted from the value of (VPTS'+3072) stored in register 555. During state 8, signal 531 selects the counter output on bus 544 to pass through multiplexer 558 onto bus 505 and into input A of adder/subtracter 513. Signal 531 during state 8 also selects output from register 555 on bus 541 to pass through multiplexer 554 onto bus 506 as input B of adder/subtracter 513. Adder/subtracter control signals 560–562 select adder/subtracter 513 to perform the operation B–A. SWAP signal 561 may be active to swap A and B inputs and COMPB signal 562 may be active such that the adder/subtracter 513 complements and converts (APTS+M) into its twos complement form with the addition of SUB signal 560 at the carry input of adder/subtracter 513. Adder/subtracter then adds (VPTS'+3072) to –(APTS+M).

If an overflow condition results from the addition of (VPTS'+3072) to –(APTS+M), then Eq. (14a) has been satisfied and the video lags the audio by at least one frame but not more than 3 frames. If no overflow condition exists the state machine jumps to state 9.

In an overflow condition, the overflow output 549 may be stored in D flip flop 576 during state 8 generating control signal output 547 which signals other circuitry (not shown) to skip one frame or a fraction thereof of a video image. Alternately, the control signal output 547 may cause the audio playback to be delayed by one frame of audio data or fraction thereof to allow the video display of images to catch up; however, this may be not preferable. In an overflow, the state machine may be reset to state 0 because further computations are unnecessary. However, if no overflow condition occurred after making the Eq. (14a) computation, the state machine 553 jumps to state 9.

During state 9, (S9 529), the computation of Eq. (13a) (APTS+M)–(VPTS'–3072)<0 may be begun in order to determine if the video leads the audio by more than one frame time. During state 9 the truncated offset value OV2 may be selected from register 557 by signal 569 to pass through multiplexer 556 onto bits 6 to 2 of bus Y[12:0] 537. Signal 531 selects the bus Y[12:0] 537 to pass through multiplexer 558 onto bus 505 and may be input into input A of adder/subtracter 513. Signal 531 during state 9 also selects bus R[12:0] 540, having the VPTS value stored within register 512 available on bits 11 to 0, to pass through multiplexer 554 and onto bus 506 as input B of adder/subtracter 513. The adder/subtracter control signals 560–562 selects adder/subtracter 513 to perform the operation B−A. SWAP signal 561 may be active to swap A and B inputs and COMPB signal 562 may be active such that the adder/subtracter 513 complements and converts (3072) into its twos complement form with the addition of SUB signal 560 at the carry input of adder/subtracter 513. Thus, adder/subtracter 513 performs the addition of (VPTS+−3072) for which the result on bus 507 may be stored into register 555 during state 9 by chip clock 518 and signal 567. Chip clock 518 also causes the state machine 553 to jump to state 10.

During state 10 the computation of Eq. (13a) (APTS+M)−(VPTS'−3072) may be completed. The value of (VPTS'−3072) which may be presently stored in register 55 may be subtracted from (APTS+M). During state 10 signal 531 selects the output of counter 511 on bus 544 to pass through multiplexer 558 onto bus 505 and into input A of adder/subtracter 513. Signal line 531 during state 10 selects the register output on bus 541 to pass through multiplexer 554 onto bus 506 as input B of adder/subtracter 513. Adder/subtracter control signals 560–562 select adder/subtracter 513 to perform the operation B−A. SWAP signal 561 may be active to swap A and B inputs and COMPB signal 562 may be active such that the adder/subtracter 513 complements and converts (VPTS'+−3072) into its twos complement form with the addition of SUB signal 560 at the carry input of adder/subtracter 513. Adder/subtracter 513 performs the addition of −(VPTS'+−3072) to (APTS+N).

If an overflow condition results from the addition of −(VPTS'+−3072) to (APTS+N), then Eq. (13a) has been satisfied and the audio leads video by at least one frame but not more than three frames. If no overflow condition exists, the state machine jumps to the idle state, state 0.

In an overflow condition, the overflow output 549 may be stored in D flip flop 578 during state 10 generating control signal output 548 which signals other circuitry (not shown) to repeat one frame or a fraction thereof of a video image to allow the audio to catch up. Alternately, the control signal output 548 may cause the audio playback to skip one frame or fraction thereof of audio data to match the video display of images; however, this may be not preferable. The state machine may be reset to state 0 by the overflow condition because further computation may be unnecessary. If no overflow condition occurs after making the Eq. (13a) computation, then the state machine rolls over to state 0 because the actual time drift may be less than that tested by Eq. (12a), (11a), (14a), and (13a).

While the A/V sync circuit of FIG. 5A has been described in the foregoing example in particular detail using only 4 equations and 2 offset values, additional equations and offset values may be accommodated by adding additional registers and providing additional states to the state machine or the computations of other equations may be performed or the present equations may be performed in other ways. Other modifications may be obvious to one skilled in the art. One modification which may be of interest may be that of FIG. 5B. FIG. 5B illustrates a second A/V sync circuit which determines an out of sync condition in a slightly different way than the circuit of FIG. 5A. Note that the truncated value of VPTS may be input to counter 511 and the truncated value of APTS may be input into register 512. In the discussion of FIG. 5A Eq. (12a),(11a), (14a), and (13a) were used. For FIG. 5B, Eq. (20a)–(19a) and (22a)–(21a) may be used for one and three frame times. The A/V Sync circuit of FIG. 5B operates in a similar manner as the A/V Sync circuit of FIG. 5A. For each occurrence of VPTS in the encoded video stream such as 306–308 in FIG. 3A, counter 510 may be reloaded with a binary value representing the VPTS value. Counter 510 may be incremented by SCLK. Upon the occurrence of APTS within the encoded data stream such as 312 in FIG. 3A, the binary value representing APTS may be stored into register 512 so that the correction for latency and the computations of the equations may occur. Otherwise, the circuit of FIG. 5B functions and operates similar to FIG. 5A as discussed above.

Figure 6:
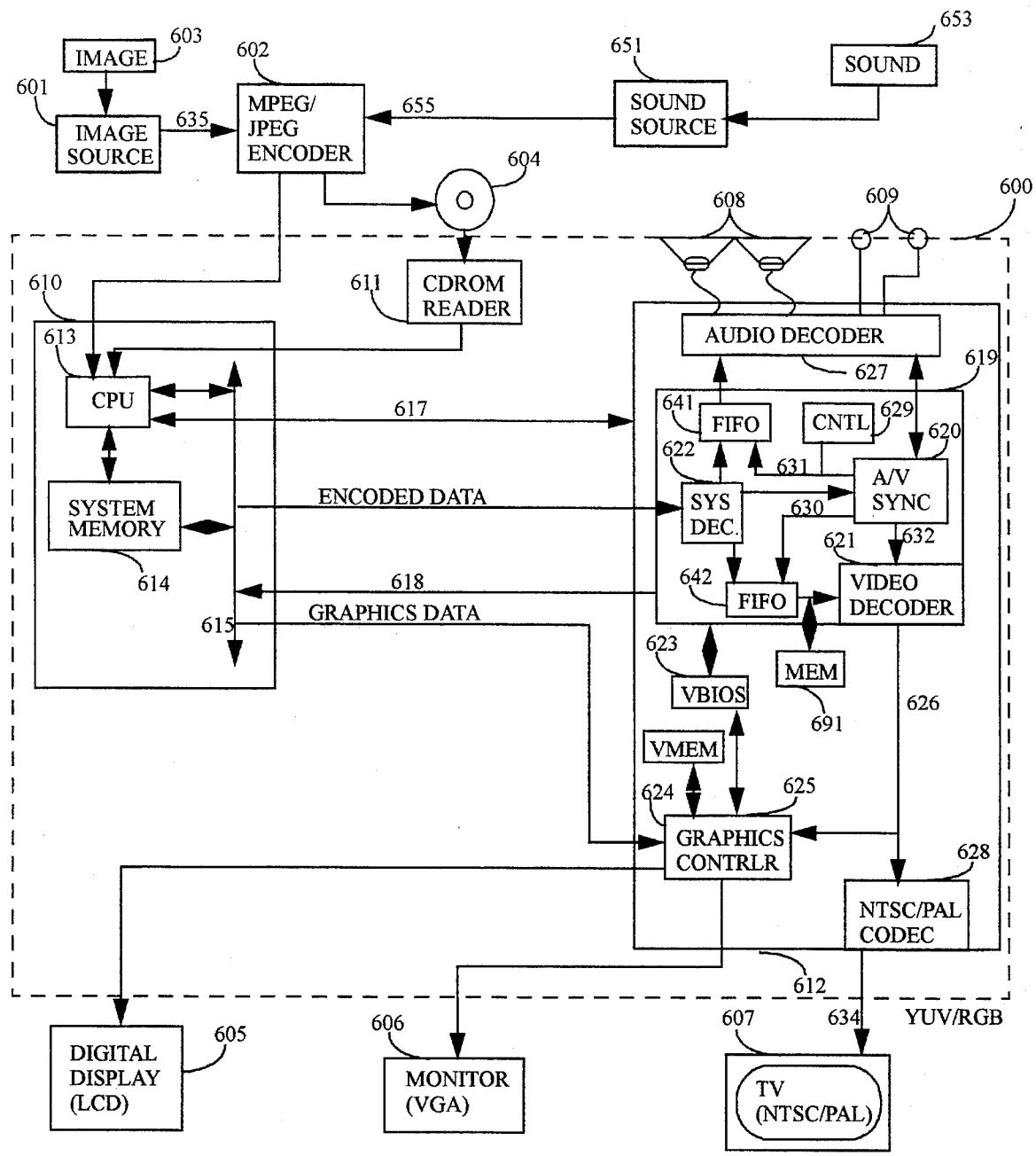
FIG. 6 illustrates a simplified system diagram of how the present invention may be used within a multimedia computer system.
Figure 8:
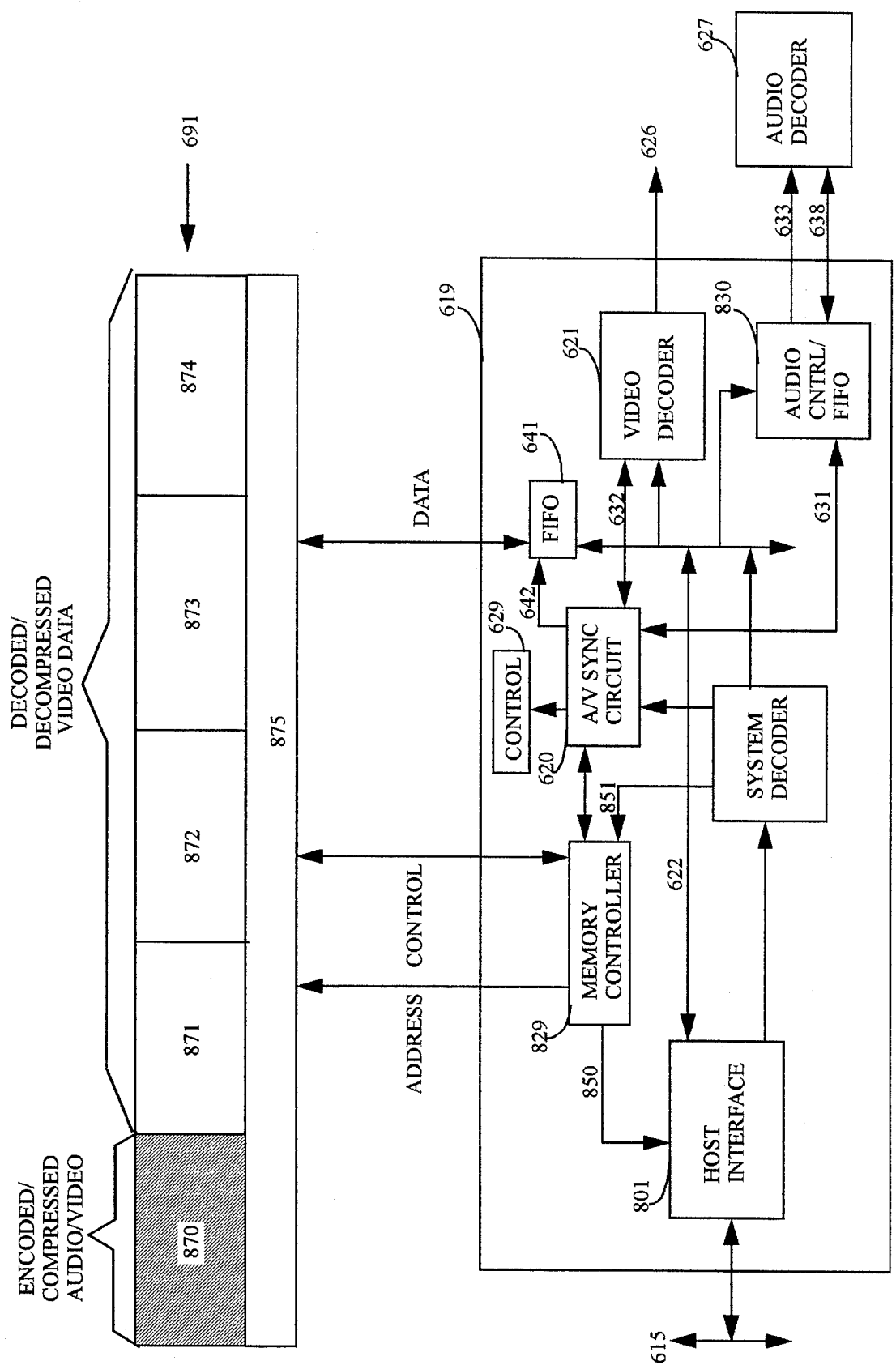
FIG. 8 illustrates the functionality and control of a frame buffer memory for storing encoded/compressed audio and video data and decoded/decompressed video data by the present invention.

FIG. 8 illustrates a portion of an exemplary multimedia system such as illustrated in FIG. 6. Memory 691 couples to the memory controller 829 and the FIFO 641 of the vidsyst decoder 619. The video decoder 621 and system decoder 622 are contained within the vidsyst decoder 619. The A/V sync circuit 620, illustrated in greater detail by FIGS. 5A–B, may be contained within the vidsyst decoder 619.

Memory 691 temporarily stores the encoded/compressed audio data and the encoded compressed video data received from a host processor (not shown) within the memory portion 870. Memory portion 870 may be large enough to store a number of MPEG type encoded video frames and a number of MPEG encoded audio data packets. Encoded/compressed audio data may be read from memory portion 870 by the vidsyst decoder 619 at the appropriate time to be sent to the audio decoder 627 through FIFO 641 and Audio control/FIFO 830. Encoded compressed video data may be read from memory portion 870 by the vidsyst decoder 619 at the appropriate time to decode and decompress the encoded/compressed video data into decoded/decompressed video data which may then be temporarily stored back into memory 961. Memory 961 temporarily stores a frame of decoded/decompressed video data in each memory portion 871 through 874.

The memory controller 829 commands the memory control logic 875 to read and write data into the addressable memory locations within the memory 691. Memory control logic 875 within memory 691 may couple addressable storage locations within the memory 691 with the vidsyst decoder 619 through data bus 824 and FIFO 641.

As described above, depending upon the results of the computations made by the A/V sync circuit 620 to detect and out of sync condition, the audio playback and the video display of images may be resynchronized by repeating or skipping video frames or fractions thereof or by skipping or delaying audio data packets or fractions thereof.

To skip frames of the video display of images, it may be preferable that encoded/compressed video data frames be skipped in order to resynchronize the video display with the audio playback. To repeat frames of the video display of images, it may be preferable that decoded/decompressed video data frames be repeated in order to resynchronize the video display with the audio playback. Alternatively packets of encoded/compressed audio data may be skipped or delayed in order to resynchronize the video display with the audio playback.

To skip encoded/compressed video data frames, an appropriate type of frame needs to be detected. As the system decoder 622 parses the encoded/compressed bit stream into encoded/compressed video data, encoded/compressed audio data, and timing information, it signals the type of video frames, such as I-type, P-type, or B-type, to the memory controller 829 through signal lines 851. Thus, memory controller 829 knows what type of encoded video frames and the addresses where each type may be found in the address space of the addressable storage locations within memory 691. Upon receiving a signal from A/V sync circuit 620, such as signals 545–548 in FIGS. 5A–B, which indicate an out of sync condition, memory controller 829 determines if there may be an appropriate type of encoded/compressed video frame type within memory 691 which may be skipped. If the memory controller 829 knows of a type which may be skipped, it modifies the addressing sequence provided to memory 691 in order to skip the desired encoded/compressed frame. The modification of the addressing sequence may be as simple as selecting a different starting address. It can be appreciated that other modifications to a given address sequence would accommodate skipping a stored encoded/compressed frame.

If the memory controller 829 knows there are no types of encoded frames within memory 691 which may be skipped, it searches for a type which may be skipped in the received encoded/compressed bit stream as it may be parsed by the system decoder 622. After a predetermined time if no type of encoded/compressed frame which may be skipped has been found within the encoded/compressed bit stream, the memory controller signals, through signal line 850, for an interrupt request to cause software to perform the resynchronization.

To repeat decoded/decompressed video data frames, memory controller 829 simply commands memory 691 to repeat a sequence of memory addresses for addressable storage locations within memory 691 which contain the same frame of video data. The selected decoded/decompressed video data frame to be repeated, may be read a second time from memory 691 and sent to the Video Decoder 621 through FIFO 641.

To skip encoded/compressed audio data, memory controller 829 may selectively skip a sequence of memory addresses or periodically skip memory addresses to more smoothly skip encoded/compressed audio data. Skipping a sequence of addresses of encoded/compressed audio data may be similar to skipping a sequence of addresses of encoded/compressed video data as described above. Preferably, the audio controller/FIFO 830 may speed up the generation of decoded/decompressed audio data by the audio decoder 627 in order to synchronize the video display of images with the audio playback. Speeding up the generation of decoded/decompressed audio data may be less perceptible to human beings than skipping encoded/compressed audio data. Audio controller/FIFO 830 may more frequently request encoded/compressed audio data from memory 691 and provide it more quickly to audio decoder 627 to speed up the generation of decoded/decompressed audio data.

To delay encoded/compressed audio data, audio controller/FIFO 830 request encoded/compressed audio data from memory 691 less frequently and provides the encoded/compressed audio data a little more slowly in order to cause audio decoder 627 to slow down the generation of decoded/decompressed audio data.

An exemplary multimedia application of the present invention may be illustrated in FIG. 6. A multimedia digital system 600, such as a multimedia computer, has a main system board 610 which may be internally coupled to CDROM reader 611, and audio/video decoder 612. The multimedia digital system 600 may be externally coupled to an encoding system which may consist of image source 601 and encoder 602, and may be coupled to external display devices such as digital display 605, CRT monitor 606, or television 607. Initially an encoding may be performed on data from some source providing image data. Examples of sources which provide image data are a motion video camera, a TV monitor, a computer, a scanner, and a still camera. Regardless of the source, image data may be provided on bus 635 into an encoder 602. In FIG. 6, an image 603 may be read by image source 601, such as a motion video camera, and converted into a stream of data on bus 635 to be encoded by encoder 602. Depending upon the type of standard used, the encoder 602 may be an MPEG I encoder, an MPEG II encoder, a JPEG encoder, or some other type of encoder which generates encoded/compressed data. After the image data has been encoded, it may be coupled to the processor directly from the encoder 602 or it may be written onto compact disk read only memory (CDROM) 604. If written onto CDROM 604, a disk may be inserted into a CDROM reader 611 in order to couple the encoded/compressed data recorded from the encoder 602 to the processor 613.

Processor 613 may be a standard microprocessor such as an Intel 80486 or a dedicated type of processor. The processor 613 may store the encoded/compressed data into system memory 614 to be later read and placed onto the system bus 615 or it may directly couple the encoded/compressed data onto the system bus 615. The system bus 615 may be an ISA bus, PCI bus, or other standard computer bus or some type of dedicated bus. The encoded/compressed data stream on system bus 615 may be coupled to an audio/video decoder system 612. The encoded/compressed data on the system bus 615 may be coupled to the vidsyst decoder 619. Within the vidsyst decoder 619, the system decoder 622 parses the encoded/compressed data into encoded/compressed video data, encoded/compressed audio data, and timing control signals. The system decoder 622 may be coupled to the audio/video sync circuit 620 to convey timing control signals. The system decoder 622 may directly couple to an audio decoder 627 to convey the encoded/compressed audio data or it may indirectly couple to the audio decoder 627 through FIFO 641 and memory 691 which provides temporary storage for frames of the encoded/compressed audio data before being conveyed to the audio decoder 627. The system decoder 622 may also be directly coupled to a video decoder 621 to convey the encoded/compressed video data. Alternatively, the system decoder 622 may indirectly couple to the video decoder 621 through FIFO 642 and memory 691 which provides temporary storage for frames of the encoded/compressed video data before being conveyed to the video decoder 621. In any case, control signals 631 for FIFO 641, control signals 630 for FIFO 642, and control signals for memory 691 provide the capability of skipping or repeating either frames or fractions thereof of encoded/compressed video data, packets or fractions thereof of encoded/compressed audio data, or frames or fractions thereof of decoded/decompressed video data.

If there may be a need to skip more than a number of predetermined frames within the memory 691 or FIFO 642, an interrupt signal may be generated by the vidsyst decoder 619 to restart the MPEG bit stream from the beginning of the sequence layer to re-align the audio/video data stream. If there may be a need to repeat more than a number of predetermined frames an interrupt signal may also be generated in order to restart the MPEG bit stream from the beginning of the sequence layer to re-align the audio/video data stream. In FIG. 5A, either multiple repeat signal 546 or the multiple skip signal 545 may generate an interrupt request which may be sent to the CPU 613. Other control signals for the FIFO 641 and 642 and memory 691 emanate from the controller 629 which are not shown.

The video decoder 621 within the vidsyst decoder 619 functions to decompress/decode the encoded/compressed video data into a decoded/decompressed video data stream which may be provided on bus 626. The graphics controller 625 receives the decoded/decompressed video data stream and in conjunction with the video display memory 624 scans an image onto either the digital display 605 or the CRT video monitor 606.

The codec 628 receives the decoded/decompressed video data stream and converts it into a data format such YUV or RGB which may be acceptable to a television 607. The codec 628 presently would convert the decoded/decompressed video data stream into an NTSC or PAL format for display on an NTSC or PAL television however future format conversions may be used as well.

The audio decoder 627 decoder/decompresser the encoded/compressed audio data stream into an decoded/decompressed audio analog signals to be conveyed to an analog amplification device (not shown) or to drive speakers 608 directly. Alternately, the audio decoder 627 decoder/decompresser the encoded/compressed audio data stream into a decoded and decompressed digital audio data stream to be conveyed to a digital amplification device (not shown) over busses 609.

The audio/video sync circuit 620, described above with reference to FIG. 5A, receives the timing information (VPTS,APTS,SCR) parsed by the system decoder 622 from the encoded/compressed bit stream. In response to the timing information, the audio/video sync circuit 620 indirectly and directly generates control signals for FIFOs 641, 642, memory 691 and video decoder 621 in order to skip or repeat one or more frames or fractions thereof of encoded/compressed or decoded/decompressed audio or video data. In order to repeat video frames or fractions thereof, the audio/video sync circuit 620 causes the video decoder 621 to generate the same output for a given period of time through control signals busses 630, 632. In order to skip video frames or fractions thereof the audio/video sync circuit 620 causes the FIFO 642 and memory 691 to skip a predetermined number of addresses in order to provide the appropriate encoded/compressed bit stream to the video decoder 621.

Similarly in order to skip audio data or fractions thereof the audio/video sync circuit 620 causes the FIFO 641 and memory 691 to skip a predetermined number of addresses in order to provide the appropriate encoded/compressed bit stream to the video decoder 621.

The video basic input/output operating system (VBIOS) 623 initializes the graphics controller 625 and the vidsyst decoder 619. The VBIOS 623 may have software coded instructions for the vidsyst decoder 619 and graphics controller 625. The instructions for the vidsyst decoder 619 perform freeze, step, fast forward, and other commands for the encoded/compressed data in a similar manner as a VHS tape player/recorder. These instructions may cause the audio/video sync circuit 620 to generate control signals which further cause the FIFOs 642, 641 and video decoder 621 therein and audio decoder 627 to skip or repeat a combination of frames of video or audio data or fractions thereof.

FIG. 6 illustrates one method of how graphics data and encoded data share a bus 615 and display devices 605–607. In this case graphics controller 625 has an internal multiplexer (not shown) to combine the decoded/decompressed video data stream on bus 626 and the graphics data on bus 615 to be displayed on the same display device monitor 606 or digital display 605. In this case the graphics data may provide the background window and other windows on the display while the decoded/decompressed data would be displayed within another window on the same display. TV monitor may have both data types combined on the one display as well.

Figure 7A:
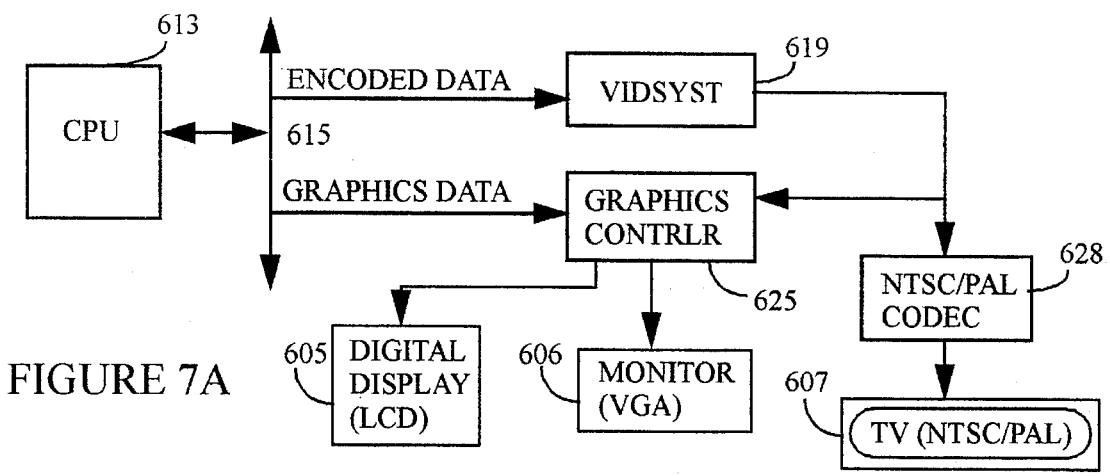
FIG. 7A–7C illustrate optional configurations of the present invention for combining graphics and encoded data transfer.

FIG. 7A illustrates a simplified block diagram of that of FIG. 6. In FIGS. 6 and 7A, the bus 615 may be time multiplexed between the encoded data being driven from the bus 615 into the vidsyst decoder 619 and graphics data being driven from the bus 615 into the graphics controller 625. In FIG. 7A and FIG. 6, the graphics controller 625 contains, an internal multiplexer to multiplex the graphics data and the decoded/decompressed video data on the same display device.

Figure 7B:
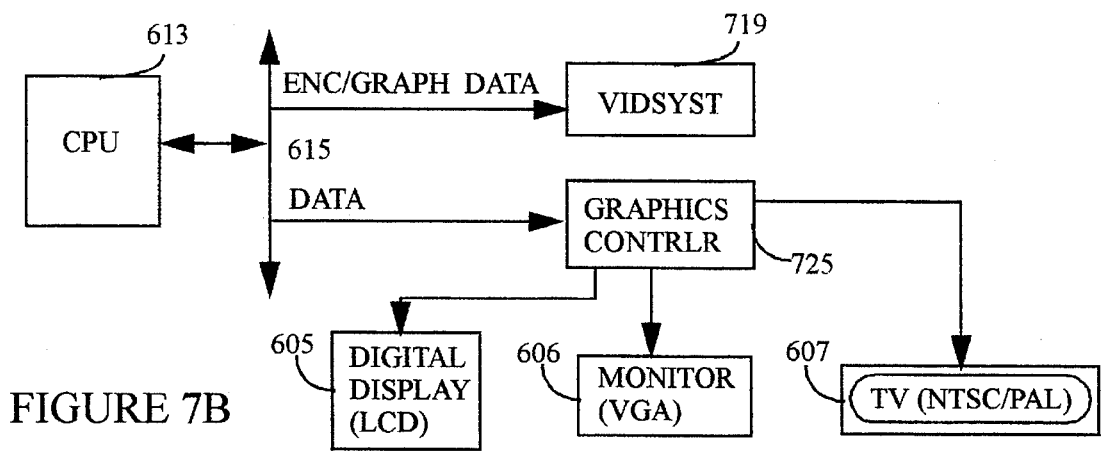

FIG. 7B illustrates another alternative for displaying graphics data and decoded/decompressed video data on the same display device. In this case bus 615 time multiplexes encoded data, graphics data, and decoded/decompressed video data generated from the encoded data. The encoded data may be placed on the bus 615 and received by the vidsyst decoder 719 having a bidirectional port. The vidsyst decoder 719 decodes/decompresses the encoded data to drive decoded/decompressed data back onto bus 615. Graphics controller 725 receives both graphics data and decoded/decompressed data such that it may be internally multiplexed together for near simultaneously display on each of digital display 605, monitor 606, or TV 607. In this case graphics controller 725 contains more circuitry in order to not only properly multiplex the two data types but also properly convert the graphics data and the decoded/decompressed video data into an NTSC or PAL signal for display onto TV 607.

Figure 7C:
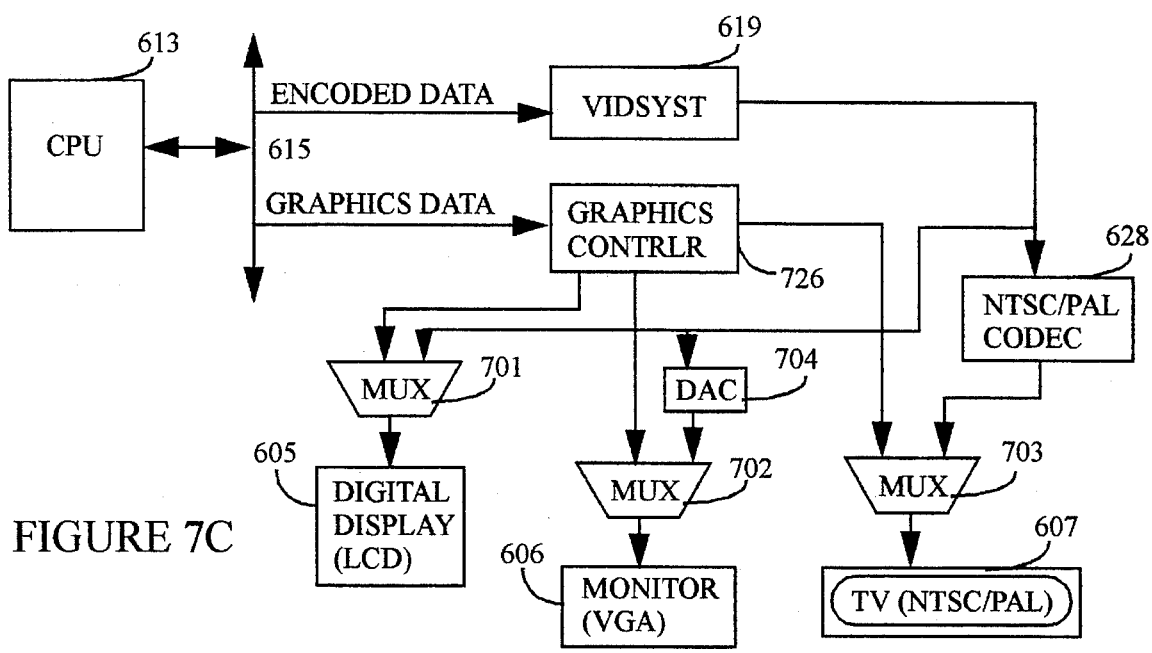

FIG. 7C illustrates another alternative for displaying graphics data and decoded/decompressed video data on the same display device using external components. Similar to FIG. 7A, bus 615 time multiplexes encoded data and graphics data. Vidsyst decoder 619 receives the encoded data from bus 615 and generates a decoded/decompressed video data stream which may be selectively coupled as pixel data to digital display 605 by multiplexer 701, selectively coupled to monitor 606 as an analog signal through digital analog converter 704 and multiplexer 702, and selectively coupled to TV 607 as an NTSC or PAL signal through NTSC/PAL Codec 628 and multiplexer 703. Graphics controller 726 receives graphics data from bus 615 and provides pixel data for digital display 605, an analog graphics signal for monitor 606, NTSC/PAL signal for TV 607, timing/control signals for displays 605–607 and multiplexer control signals for multiplexers 701–703. Using the multiplexers 701–703 the graphics controller 726 properly generates the multiplexer control signals thereby timing when graphics data and the decoded/decompressed video data from the vidsyst decoder 619 may be displayed on any of displays 605–607. Internal multiplexers within graphics controllers 625 and 725 operate in a similar fashion as external multiplexers 701–703.

As discussed above in connection with FIG. 3A, there may be a latency in the occurrence of VPTS 308 from the occurrence of APTS 312. The number of SCLK clock cycles for the latency between receiving VPTS 307 and APTS 312 may be the value N 314. The number of SCLK clock cycles for the latency between receiving APTS 312 and VPTS 308 may be the value M 313.

In the embodiments discussed above, latency values N or M may be calculated by software and a resultant value stored in a register for use in correcting audio or video time stamp values. As noted above, for practical reasons, it may be preferable to correct latency value N for video such that the audio data stream is uninterrupted.

In particular, in one contemplated embodiment, a register may be provided within the video decoder for storing a latency value N as a three bit value, with two bits indicating absolute value and one bit indicating sign (i.e., plus or minus) providing a total of seven steps for latency correction. Each step may represent a number of SCR clock cycles, (e.g. 1536 clock cycles) such that the contents of the latency register may represent seven incremental steps as shown in Table I below.

TABLE I

| Latency Register Bit | | | | |
|---|---|---|---|---|
| 2 | 1 | 0 | | Clock Cycles |
| 1 | 1 | 1 | + 6144 | SCR Clock Cycles |
| 1 | 1 | 0 | + 3072 | SCR Clock Cycles |
| 1 | 0 | 1 | + 1536 | SCR Clock Cycles |
| 1 | 0 | 0 | 0 | SCR Clock Cycles |
| 0 | 0 | 1 | − 1536 | SCR Clock Cycles |
| 0 | 1 | 0 | − 3072 | SCR Clock Cycles |
| 0 | 1 | 1 | − 6144 | SCR Clock Cycles |

In the embodiment of FIGS. 4A and 4B discussed above, the video decoder may indicate through comparator 414 whether a frame has been skipped or repeated, depending upon whether the decoder is behind or ahead. These latency factors within the video decoder help with the difficulties of latency, as an associated audio device may have a FIFO a hundred units deep or only a few units deep. Thus, latency may occur between the time the data enters the decoder and sound is output to a speaker.

One disadvantage of using software techniques for latency correction, is that such latency calculations may be performed only once, or a finite number of times during audio and video decoding. For example, an initial latency value may be loaded from a .INI file representing a standard latency value calculated in a laboratory. Upon execution of interrupts, host software may perform additional latency calculations or adjustments based on skipped or repeated frames indicated by comparator 414. However, the execution of such latency calculations may be limited by the software, as continual latency adjustments may unduly burden a host software program. Moreover, in such software latency adjustment embodiments, only a limited number of latency values may be provided (e.g., seven), restricted by the number of register bits available for latency value storage. Thus, a latency value which is not optimal may be used for latency correction. As synchronization is maintained by the apparatus by skipping or repeating frames, overall synchronization may not be affected, even by a less than optimal latency value. However, in some applications (e.g., high definition video, video editing or the like), such repeated frame skipping may be unacceptable.

Moreover, under certain conditions, such as frame stepping or switching between primary and secondary audio decoders, latency values may change on a dynamic basis. Fixed latency values calculated using software solutions may not correct for such latency conditions. Audio decompression in software may present additional difficulties where latency may vary over time.

In the embodiment of this application, latency values may be calculated on a dynamic basis using a hardware solution. As discussed above in connection with FIG. 5B, output signals may be generated indicating that video and audio have been out of synchronization (e.g., by at least three frames). If the overflow output 549 of adder/subtracter 513 indicates an overflow condition, such an overflow condition may be stored in one of flip-flops 572, 574, 576, 578 during states S4, S6, S8, and S10 to produce output signals indicating whether single or multiple frames should be skipped or repeated.

Figure 10:
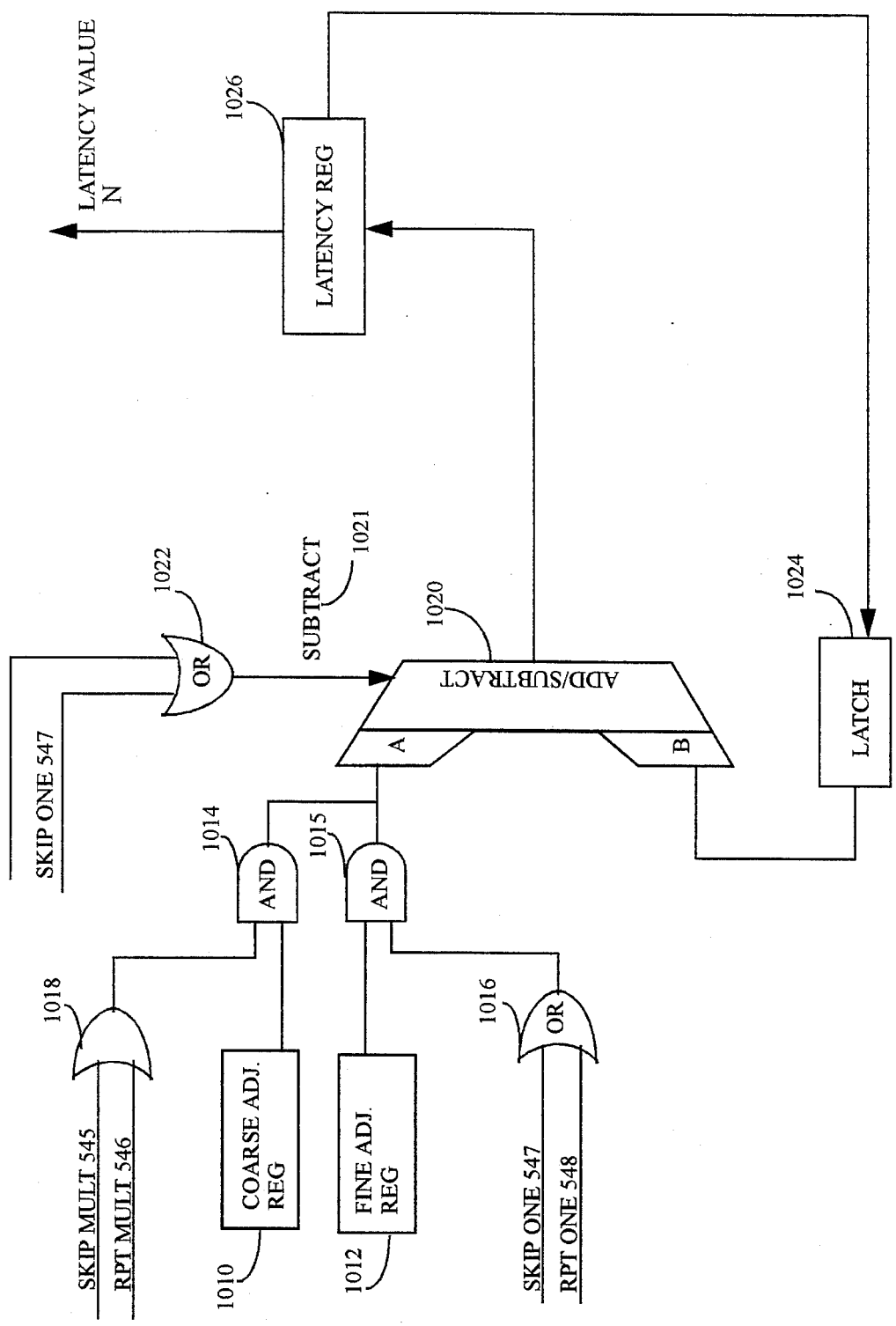
FIG. 10 is a block diagram of the auto latency hardware of the present application.

In the embodiment discussed above, the outputs of flip-flops 572, 574, 576, and 578 are used to skip or repeat frames. In the embodiment of the present application, these outputs may be further utilized to adjust latency values M or N of FIG. 3A in hardware so as to reduce or eliminate frame skipping or repeating. FIG. 10 is a block diagram illustrating hardware implementing the auto latency adjustment mechanism of the present invention. The actual elements and configuration of FIG. 10 is for illustration purposes only. It is entirely within the spirit and scope of the present invention to enable such circuitry using other forms and arrangement of combinational and sequential logic circuitry as is known in the art.

As discussed above, repeating and skipping of video frames avoids creating audible discontinuities in the audio data stream. Thus, for the purposes of illustration, the embodiment of FIG. 10 illustrates an auto latency technique for adjusting latency value N for video presentation time stamps (VPTS). In the embodiment of FIG. 10, two registers 1010 and 1012 may be provided for storing coarse and fine latency adjustment values, respectively. These adjustment values may be determined empirically, but may be on the order of 1536 clock cycles for course latency adjustment stored in register 1010 and 384 clock cycles for fine latency adjustment stored in register 1012. The actual values stored in latency registers 1010 and 1012 may be binary values representing minimum latency adjustments. Thus for example, fine adjustment register 1012 may comprise a single bit (e.g., binary 1) representing fine adjustment level whereas coarse adjustment register may contain a larger binary number (e.g., binary 10) representing a coarse adjustment level.

Alternately, only one latency adjustment value may be utilized. A single latency value may reduce overall complexity of the circuitry and may produce suitable results.

Outputs from flip-flops 572, 574, 576, and 578 of FIG. 5A are used to select coarse and fine latency adjustment values through AND gates 1014 and 1015. If multiple frames are being skipped or repeated, as indicated by the ORing of signals SKIP MULT 545 and RPT MULT 546 in OR gate 1018, the contents of coarse adjustment register 1010 is enabled by AND gate 1014. If only single frames are being skipped or repeated, as indicated by the Oring of signals SKIP ONE 547 and RPT ONE 548 in OR gate 1016, the contents of fine adjustment register 1012 is enabled by AND gate 1015.

Note that the contents of fine and coarse registers 1010 and 1012 may contain a number of bits. For the purposes of illustration in FIG. 10, multiple AND gates to enable these multiple bits are not shown for clarity.

The outputs of AND gates 1014 and 1015 are fed to ADDER/SUBTRACTER 1020 to be combined with latency value N fed to latch 1024 from latency register 1026. Subtract enable line 1021 may be enabled by signals SKIP MULT 545 or SKIP ONE 547 ORed in OR gate 1022. If video frames are being skipped, then the video may be lagging the audio, and the video latency N may need to be reduced. The stored latency value N may be reduced by subtracting a coarse or fine latency value in ADDER/SUBTRACTER 1020 and storing the new latency value in latency register 1026.

Similarly, if video frames are being repeated, then the video may be leading the audio, and the video latency value N may need to be increased. The stored latency value N may be increased by adding a coarse of fine latency value in ADDER/SUBTRACTER 1010 and storing the new latency value in latency register 1026.

Figure 11:
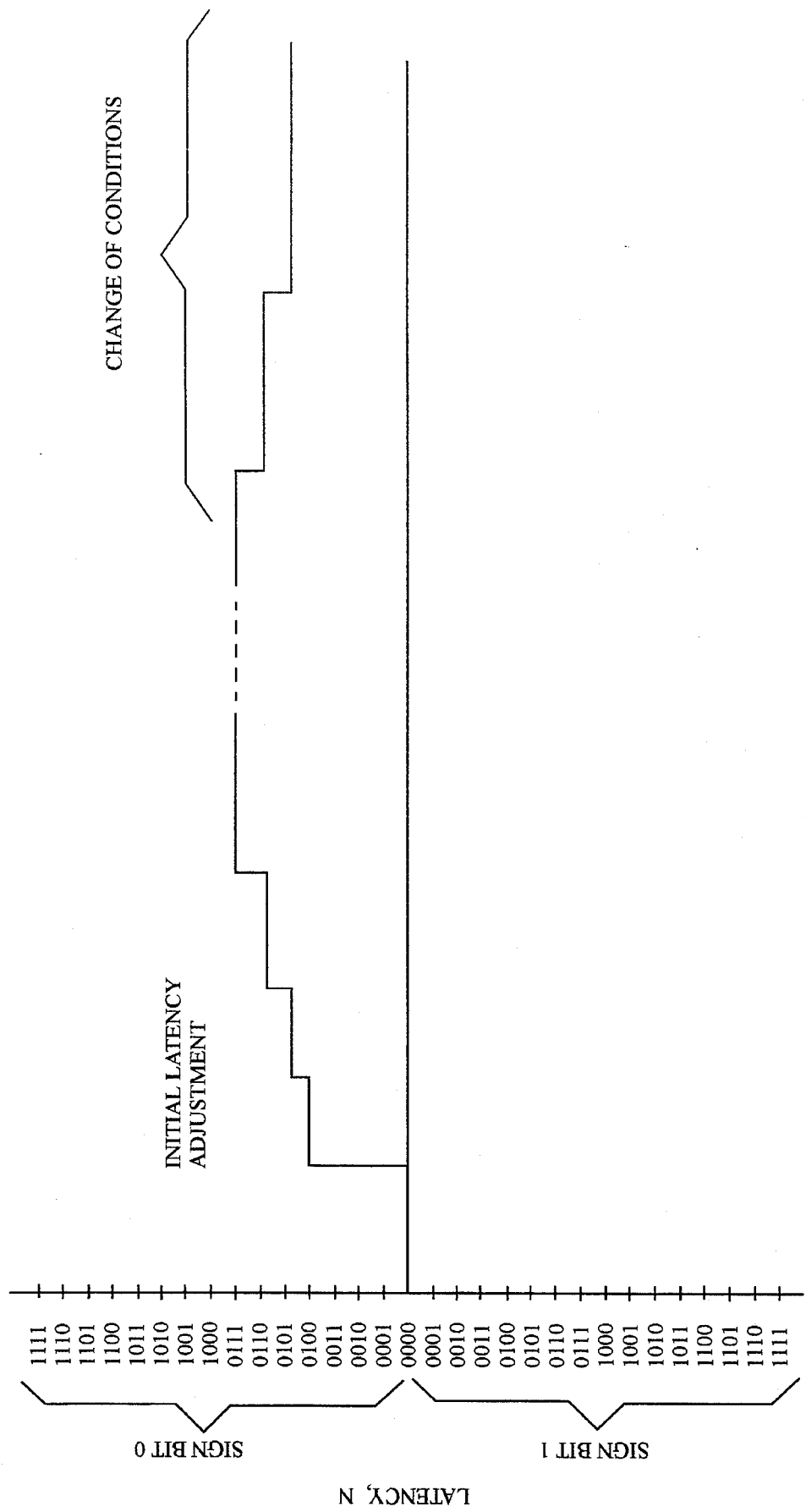
FIG. 11 is a diagram illustrating the operation of the hardware of FIG. 10.

FIG. 11 illustrates adjustment of latency value N in operation. One further advantage of the hardware solution of the present invention is that since overall latency range may be increased, and latency values adjusted dynamically, the need to load an initial latency value from a .INI file or the like may be reduced or eliminated. Within a few frames, the circuitry of FIG. 10 may produce an optimal latency value.

As illustrated in FIG. 11, an initial latency value may be set to zero upon power up. In the embodiment of FIG. 10, latency register may contain additional bits, for example a total of four bits, one for sign (+/−) and four bits for latency value, providing a total of thirty-one latency levels. After initial power up, multiple video frames may be repeated, as in this example, the video leads the audio. Latency value N may be adjusted by a coarse factor (e.g., four levels) to increase latency value N.

Subsequently, as shown in this example, some additional single video frames may be repeated. Latency value N may then be adjusted by a fine value (e.g., one level) until no further frames are repeated. If conditions change during operation, latency value may be continually and dynamically adjusted.

The advantages of hardware latency adjustment are numerous. Freeing the software of latency calculations make for much simpler software modeling and more compact code. Moreover, by providing latency adjustment in hardware, latency may be continually adjusted without interfering with operation of software. In addition, more levels of latency adjustment may be provided to provide for more fine tuning of latency to avoid repeating or skipping of video or audio frames.

While the preferred embodiment and various alternative embodiments of the invention have been disclosed and described in detail herein, it may be obvious to those skilled in the art that various changes in form and detail may be made therein without departing from the spirit and scope thereof.

What is claimed is:

1. An apparatus for controlling playback of audio and video signals from an encoded data stream comprising at least audio data packets, video data packets, audio presentation time stamps and video presentation time stamps, said apparatus comprising:

a system decoder for receiving the encoded data stream and separating the data stream into an encoded audio data stream comprising at least the audio data packets and audio presentation time stamps and an encoded video data stream comprising at least the video data packets and video presentation time stamps;

an audio decoder, for receiving the audio data packets from the encoded audio data stream and decoding the audio data packets;

a video decoder, coupled to said system decoder and said audio decoder, for receiving a system time clock and the encoded video data stream and decoding the encoded video data stream in synchronization with the system time clock, said video decoder further comprising:

a latency value register for storing a video decoder latency value;

counter means, coupled to said latency value register, for adding the latency value to a video presentation time stamp value to produce a normalized video presentation time stamp value;

subtracter means, coupled to said counter means, for subtracting the normalized video presentation time stamp value from an audio presentation time stamp value to produce a difference value;

comparator means, coupled to said subtracter means, for comparing the difference value with a predetermined time drift threshold and outputting a video frame skip signal if the difference value exceeds the pre-determined time drift threshold and the difference value is negative and outputting a video frame repeat signal if the difference value exceeds the predetermined time drift threshold and the difference value is positive; and latency value adjustment means, coupled to said comparator means and said latency value register, for adding a predetermined value to the latency value stored in said latency value register if the video frame repeat signal is generated by the comparator means and for subtracting the predetermined value from the latency value stored in said latency value register if the video frame skip signal is generated by the comparator means.

2. The apparatus of claim 1, wherein said comparator means compares the difference value with the predetermined time drift threshold and outputs a single video frame skip signal if the difference value exceeds the pre-determined time drift threshold by a first predetermined amount and the difference value is negative and outputs a multiple video frame skip signal if the difference value exceeds the predetermined time drift threshold by a second predetermined amount and the difference value is negative.

3. The apparatus of claim 2, wherein said latency value adjustment means subtracts a first predetermined value from the latency value stored in said latency value register if the single video frame skip signal is generated by the comparator means and subtracts a second predetermined value from the latency value stored in said latency value register if the multiple video frame skip signal is generated by the comparator means.

4. The apparatus of claim 1, wherein said comparator means compares the difference value with the predetermined time drift threshold and outputs a single video frame repeat signal if the difference value exceeds the pre-determined time drift threshold by a first predetermined amount and the difference value is positive and outputs a multiple video frame repeat signal if the difference value exceeds the predetermined time drift threshold by a second predetermined amount and the difference value is positive.

5. The apparatus of claim 4, wherein said latency value adjustment means adds a first predetermined value to the latency value stored in said latency value register if the single video frame repeat signal is generated by the comparator means and adds a second predetermined value to the latency value stored in said latency value register if the multiple video frame repeat signal is generated by the comparator means.

6. An apparatus for controlling playback of audio and video signals from an encoded data stream comprising at least audio data packets, video data packets, audio presentation time stamps and video presentation time stamps, said apparatus comprising:

a system decoder for receiving the encoded data stream and separating the data stream into an encoded audio data stream comprising at least the audio data packets and audio presentation time stamps and an encoded video data stream comprising at least the video data packets and video presentation time stamps;

a latency value register for storing a decoder latency value;

counter means, coupled to said latency value register, for adding the latency value to one of the video and audio presentation time stamp values to produce a normalized presentation time stamp value;

subtracter means, coupled to said counter means, for subtracting the normalized presentation time stamp value from the other of the audio and video presentation time stamp values to produce a difference value;

comparator means, coupled to said subtracter means, for comparing the difference value with a predetermined time drift threshold and outputting a frame skip/repeat signal if the difference value exceeds the pre-determined time drift threshold; and latency value adjustment means, coupled to said comparator means and said latency value register, for modifying the latency value stored in said latency value register if the frame skip/repeat signal is generated by the comparator means.

7. The apparatus of claim 6, wherein said comparator means compares the difference value with the predetermined time drift threshold and outputs a single video frame skip/repeat signal if the difference value exceeds the predetermined time drift threshold by a first predetermined amount.

8. The apparatus of claim 7, wherein said latency value adjustment means modifies the latency value stored in said latency value register by a first predetermined value if the single video frame skip/repeat signal is generated by the comparator means.

9. The apparatus of claim 8, wherein said comparator means compares the difference value with the predetermined time drift threshold and outputs a multiple video frame skip/repeat signal if the difference value exceeds the predetermined time drift threshold by a second predetermined amount.

10. The apparatus of claim 9, wherein said latency value adjustment means modifies the latency value stored in said latency value register by a second predetermined value if the multiple video frame skip/repeat signal is generated by the comparator means.

11. A method for controlling playback of audio and video signals from an encoded data stream comprising at least audio data packets, video data packets, audio presentation time stamps and video presentation time stamps, the method comprising the steps of:

separating, in a system decoder the encoded data stream into an encoded audio data stream comprising at least the audio data packets and audio presentation time stamps and an encoded video data stream comprising at least the video data packets and video presentation time stamps, decoding, in an audio decoder, the audio data packets from the encoded audio data stream, decoding, in a video decoder, the encoded video data stream in synchronization with a system time clock, adding a stored latency value to a video presentation time stamp value to produce a normalized video presentation time stamp value, subtracting the normalized video presentation time stamp value from an audio presentation time stamp value to produce a difference value, comparing the difference value with a predetermined time drift threshold and outputting a video frame skip signal if the difference value exceeds the pre-determined time drift threshold and the difference value is negative and outputting a video frame repeat if the difference value exceeds the predetermined time drift threshold and the difference value is positive, adding a predetermined value to the latency value if the video frame repeat signal is generated in the comparing step, and subtracting the predetermined value from the latency value if the video frame skip signal is generated in the comparing step.

12. The method of claim 11, wherein said comparing step further comprises the steps of:

comparing the difference value with the predetermined time drift threshold, outputting a single video frame skip signal if the difference value exceeds the pre-determined time drift threshold by a first predetermined amount and the difference value is negative, and outputting a multiple video frame skip signal if the difference value exceeds the pre-determined time drift threshold by a second predetermined amount and the difference value is negative.

13. The method of claim 12, wherein said step of subtracting the predetermined value from the latency value further comprises the steps of:

subtracting a first predetermined value from the latency value if the single video frame skip signal is generated in said comparing step, and subtracting a second predetermined value from the latency value if the multiple video frame skip signal is generated in said comparing step.

14. The method of claim 11, wherein said comparator step further comprises the steps of:

comparing the difference value with the predetermined time drift threshold, outputting a single video frame repeat signal if the difference value exceeds the pre-determined time drift threshold by a first predetermined amount and the difference value is positive, and outputting a multiple video frame repeat signal if the difference value exceeds the pre-determined time drift threshold by a second predetermined amount and the difference value is positive.

15. The method of claim 14, wherein the step of adding the predetermined value to the latency value comprises the steps of:

adding a first predetermined value to the latency value if the single video frame repeat signal is generated in the comparing step, and adding a second predetermined value to the latency value if the multiple video frame repeat signal is generated in the comparing step.

16. A method for controlling playback of audio and video signals from an encoded data stream comprising at least audio data packets, video data packets, audio presentation time stamps and video presentation time stamps, said apparatus comprising:

separating the encoded data stream into an encoded audio data stream comprising at least the audio data packets and audio presentation time stamps and an encoded video data stream comprising at least the video data packets and video presentation time stamps;

combining a decoder latency value to one of the video and audio presentation time stamp values to produce a normalized presentation time stamp value;

subtracting the normalized presentation time stamp value from the other of the audio and video presentation time stamp values to produce a difference value;

comparing the difference value with a predetermined time drift threshold and outputting a frame skip/repeat signal if the difference value exceeds the pre-determined time drift threshold; and modifying the latency value if the frame skip/repeat signal is generated in the comparing step.

17. The method of claim 16, wherein said comparing step further comprises the steps of:

comparing the difference value with the predetermined time drift threshold, and outputting a single video frame skip/repeat signal if the difference value exceeds the pre-determined time drift threshold by a first predetermined amount.

18. The method of claim 17, wherein step of modifying further comprises the step of combining the latency value with a first predetermined value if the single video frame skip/repeat signal is generated in the comparing step.

19. The method of claim 18, wherein said step of comparing further comprises the steps of:

comparing the difference value with the predetermined time drift threshold, and outputting a multiple video frame skip/repeat signal if the difference value exceeds the pre-determined time drift threshold by a second predetermined amount.

20. The method of claim 19, wherein said modifying step further comprises the step of combining the latency value with a second predetermined value if the multiple video frame skip/repeat signal is generated by in the comparing step.

* * * * *